(12) United States Patent
Nakada et al.

(10) Patent No.: US 9,199,166 B2
(45) Date of Patent: Dec. 1, 2015

(54) GAME SYSTEM WITH VIRTUAL CAMERA CONTROLLED BY POINTING DEVICE

(75) Inventors: Ryuichi Nakada, Kyoto (JP); Yasuhito Fujisawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2048 days.

(21) Appl. No.: 11/797,438

(22) Filed: May 3, 2007

(65) Prior Publication Data

US 2007/0265088 A1 Nov. 15, 2007

(30) Foreign Application Priority Data

May 9, 2006 (JP) .................................. 2006-130727

(51) Int. Cl.
| | | |
|---|---|---|
| *A63F 13/04* | (2006.01) | |
| *A63F 13/06* | (2006.01) | |
| *A63F 13/219* | (2014.01) | |
| *A63F 13/21* | (2014.01) | |
| *A63F 13/211* | (2014.01) | |
| *A63F 13/213* | (2014.01) | |
| *A63F 13/20* | (2014.01) | |

(52) U.S. Cl.
CPC .............. *A63F 13/04* (2013.01); *A63F 13/21* (2014.09); *A63F 13/06* (2013.01); *A63F 13/20* (2014.09); *A63F 13/211* (2014.09); *A63F 13/213* (2014.09); *A63F 13/219* (2014.09); *A63F 2300/1087* (2013.01); *A63F 2300/6669* (2013.01); *A63F 2300/6676* (2013.01); *A63F 2300/8076* (2013.01)

(58) Field of Classification Search
CPC ......... A63F 13/04; A63F 13/06; A63F 13/20; A63F 13/01; A63F 13/211; A63F 13/213; A63F 13/2192; A63F 2300/1087; A63F 2300/6661; A63F 2300/6676; A63F 2300/8076
USPC .......................................... 463/30–33, 36–39
See application file for complete search history.

(56) References Cited

U.S. PATENT DOCUMENTS 5,415,549 A * 5/1995 Logg ............................... 434/38
5,616,031 A * 4/1997 Logg ............................... 434/38

(Continued)

FOREIGN PATENT DOCUMENTS

| JP | 07-116343 | 5/1995 |
| JP | H09-131466 | 5/1997 |

(Continued)

OTHER PUBLICATIONS

Japanese Office Action issued for Japanese Patent Application No. JP2012-105126, dated Nov. 13, 2012 (with an English Translation).

(Continued)

*Primary Examiner* — William H McCulloch, Jr.
(74) *Attorney, Agent, or Firm* — Nixon & Vanderhye, P.C.

(57) ABSTRACT

Coordinates on a detection surface are obtained using data output from a pointing device. The obtained coordinates are used to perform a designated coordinate-related process which is a game process. On the other hand, a designated coordinate-unrelated process is performed which is a game process which does not use the obtained coordinates. Also, it is detected whether or not coordinates within a predetermined region of the detection surface have been obtained. Depending on a result of the detection, the designated coordinate-related process and the designated coordinate-unrelated process are switched and executed.

22 Claims, 22 Drawing Sheets

(56) References Cited

U.S. PATENT DOCUMENTS

| | | | |
|---|---|---|---|
| 6,424,410 B1* | 7/2002 | Pelosi | 356/139.03 |
| 6,509,896 B1* | 1/2003 | Ogasawara et al. | 345/419 |
| 7,392,154 B2* | 6/2008 | Nakanishi et al. | 702/155 |
| 7,405,726 B2* | 7/2008 | Pelosi | 345/158 |
| 7,610,558 B2* | 10/2009 | Morita | 715/757 |
| 7,789,741 B1* | 9/2010 | Fields et al. | 463/2 |
| 7,833,099 B2* | 11/2010 | Sato et al. | 463/37 |
| 8,376,849 B2* | 2/2013 | Westlund et al. | 463/33 |
| 2001/0002126 A1* | 5/2001 | Rosenberg et al. | 345/156 |
| 2001/0003712 A1* | 6/2001 | Roelofs | 463/37 |
| 2001/0024972 A1* | 9/2001 | Kitao | 463/33 |
| 2001/0026266 A1* | 10/2001 | Schena et al. | 345/163 |
| 2001/0029202 A1* | 10/2001 | Kondo et al. | 463/31 |
| 2001/0035845 A1* | 11/2001 | Zwern | 345/8 |
| 2001/0040553 A1* | 11/2001 | Rosenberg | 345/158 |
| 2002/0013172 A1* | 1/2002 | Kaku et al. | 463/32 |
| 2002/0022515 A1* | 2/2002 | Boku et al. | 463/6 |
| 2002/0032053 A1* | 3/2002 | Shoji et al. | 463/30 |
| 2002/0034979 A1* | 3/2002 | Yamamoto et al. | 463/31 |
| 2002/0065121 A1* | 5/2002 | Fukunaga et al. | 463/8 |
| 2002/0151361 A1* | 10/2002 | Goden et al. | 463/33 |
| 2002/0169013 A1* | 11/2002 | Serizawa et al. | 463/6 |
| 2002/0175897 A1* | 11/2002 | Pelosi | 345/158 |
| 2003/0040349 A1* | 2/2003 | Imaeda et al. | 463/3 |
| 2003/0216176 A1* | 11/2003 | Shimizu et al. | 463/31 |
| 2004/0046760 A1* | 3/2004 | Roberts et al. | 345/474 |
| 2004/0201544 A1* | 10/2004 | Love et al. | 345/1.1 |
| 2005/0085298 A1* | 4/2005 | Woolston | 463/37 |
| 2005/0124413 A1* | 6/2005 | Ueshima | 463/30 |
| 2005/0164784 A1* | 7/2005 | Yamamoto et al. | 463/30 |
| 2005/0209066 A1* | 9/2005 | Penney | 482/84 |
| 2005/0255912 A1* | 11/2005 | Love et al. | 463/30 |
| 2005/0264527 A1* | 12/2005 | Lin | 345/156 |
| 2006/0017726 A1* | 1/2006 | Saikawa et al. | 345/419 |
| 2006/0258454 A1* | 11/2006 | Brick | 463/36 |
| 2007/0049374 A1* | 3/2007 | Ikeda et al. | 463/30 |
| 2007/0050597 A1* | 3/2007 | Ikeda | 712/1 |
| 2007/0060408 A1* | 3/2007 | Schultz et al. | 473/131 |
| 2007/0082742 A1* | 4/2007 | Takizawa et al. | 463/43 |
| 2007/0218997 A1* | 9/2007 | Cho | 463/42 |
| 2007/0254738 A1* | 11/2007 | Sato | 463/31 |
| 2007/0265085 A1* | 11/2007 | Miyamoto et al. | 463/37 |
| 2007/0265088 A1* | 11/2007 | Nakada et al. | 463/37 |
| 2007/0270215 A1* | 11/2007 | Miyamoto et al. | 463/32 |
| 2007/0270219 A1* | 11/2007 | Sugioka et al. | 463/37 |
| 2007/0270222 A1* | 11/2007 | Yamanaka et al. | 463/37 |
| 2008/0001951 A1* | 1/2008 | Marks et al. | 345/474 |
| 2008/0024435 A1* | 1/2008 | Dohta | 345/156 |
| 2008/0076566 A1* | 3/2008 | Miyamoto | 463/37 |
| 2008/0146303 A1* | 6/2008 | Ueshima | 463/7 |
| 2008/0153601 A1* | 6/2008 | Tahara et al. | 463/43 |
| 2009/0093314 A1* | 4/2009 | Ichikawa | 463/43 |
| 2009/0102847 A1* | 4/2009 | Yabuki et al. | 345/440 |
| 2011/0172016 A1* | 7/2011 | Ikeda et al. | 463/37 |
| 2011/0172017 A1* | 7/2011 | Takahashi et al. | 463/39 |
| 2011/0183765 A1* | 7/2011 | Kobayashi et al. | 463/43 |
| 2012/0264512 A1* | 10/2012 | Abe et al. | 463/31 |
| 2013/0109473 A1* | 5/2013 | Yamashita et al. | 463/31 |
| 2015/0165311 A1* | 6/2015 | Ikeda et al. | 463/37 |

FOREIGN PATENT DOCUMENTS

| | | |
|---|---|---|
| JP | 10-235014 | 9/1998 |
| JP | 11-86038 | 3/1999 |
| JP | 11-090043 | 4/1999 |
| JP | 11-272841 | 10/1999 |
| JP | 2001-109714 | 4/2001 |
| JP | 2003-251070 | 9/2003 |

OTHER PUBLICATIONS

Gun Survivor 4 Biohazard Heroes Never Die Complete Strategy Guide, CAPCOM, Co., Ltd. Mar. 15, 2003, pp. 7-8, 10 and 13.

Shukan Famitsu, vol. 20, No. 40, pp. 14-15, Enterbrain, Inc., Oct. 7, 2005.

Japanese Office Action issued for Japanese Patent Application No. 2006-130727, dated Aug. 23, 2012 with English Translation.

* cited by examiner

F I G. 7
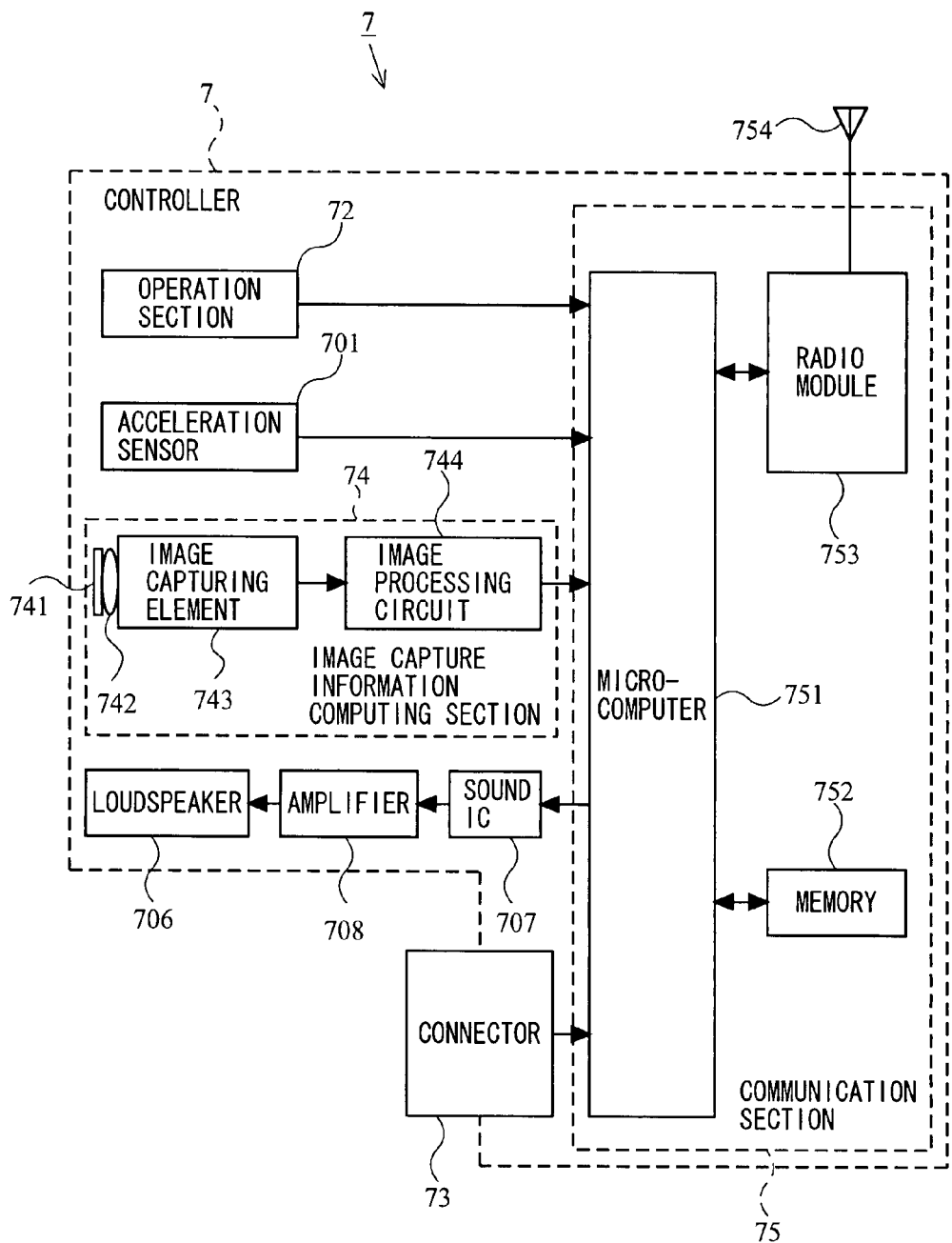

F I G. 8
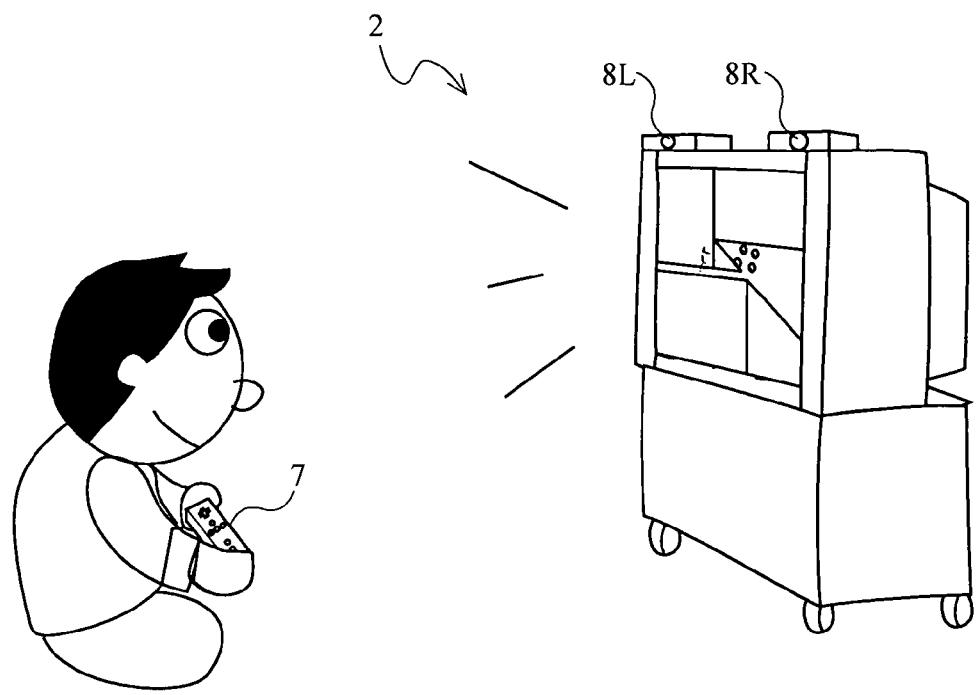

F I G. 1 3
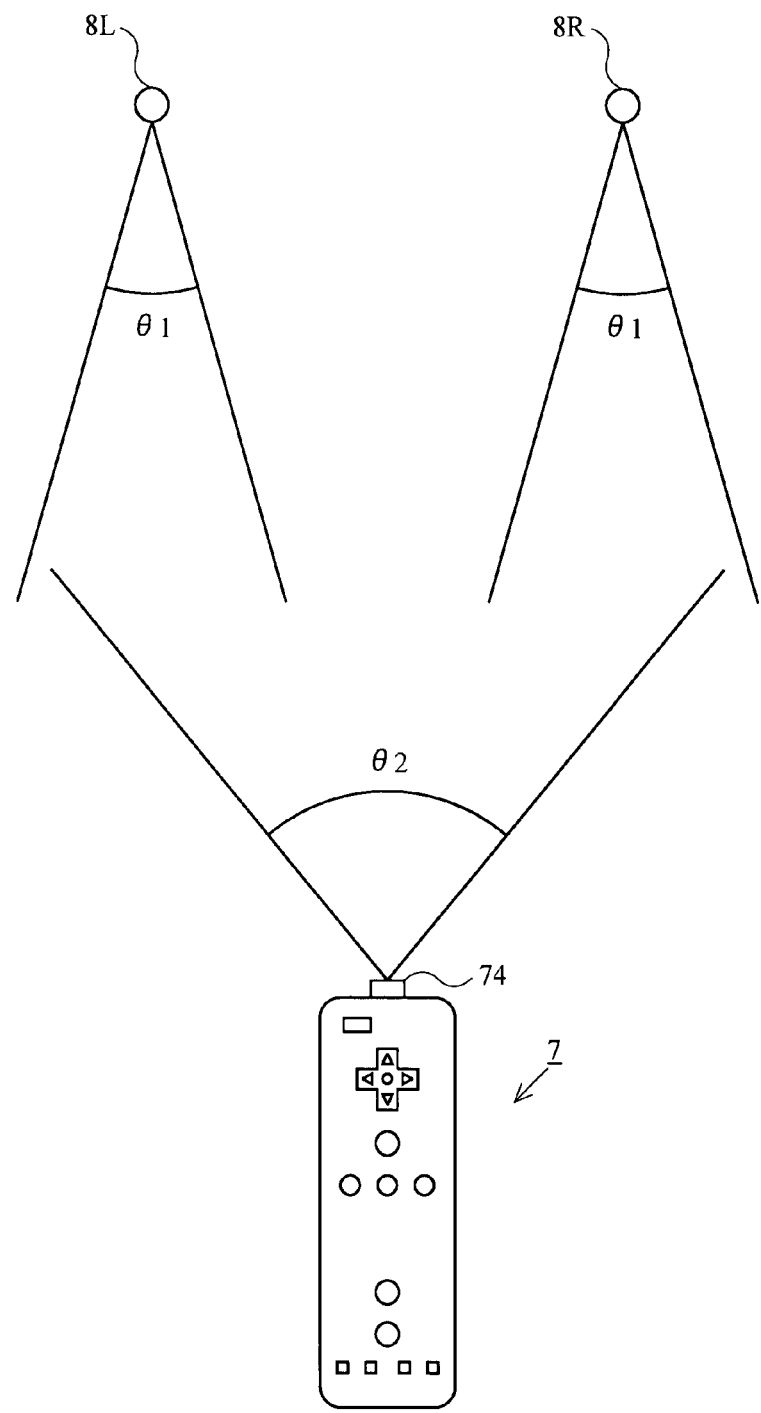

F I G. 1 4
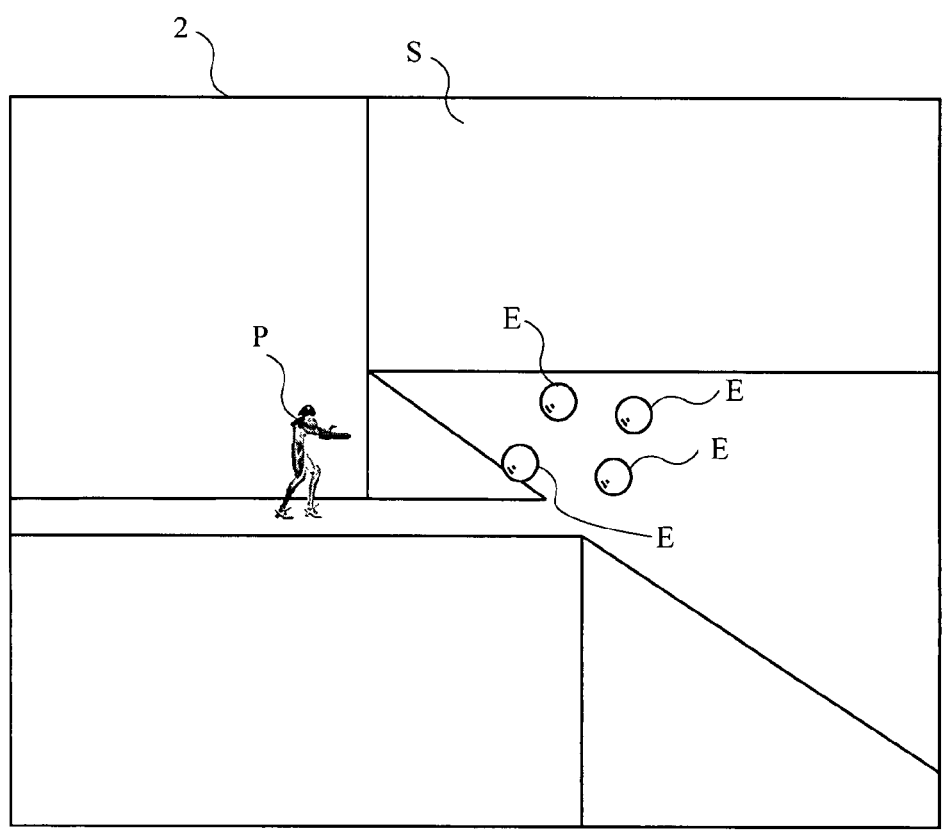

F I G. 1 7
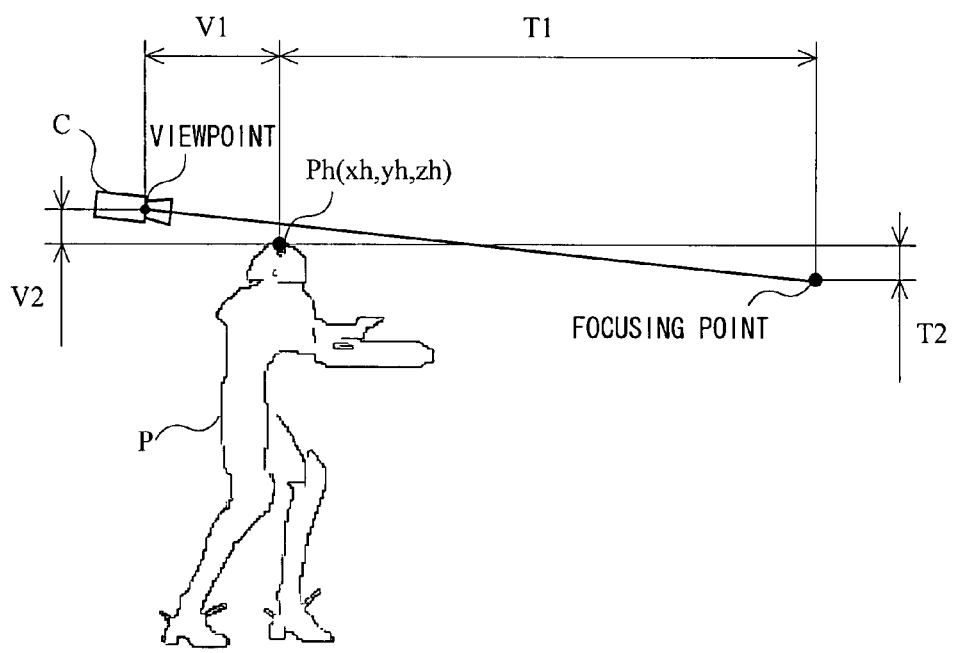

FIG. 19

| OPERATION MEANS | OPERATION METHOD | GAME CONTROL PROCESS |
|---|---|---|
| CROSS KEY | PRESS DOWN LEFTWARD AND RIGHTWARD DIRECTION PIECES | LEFTWARD AND RIGHTWARD MOVEMENTS |
| CROSS KEY | PRESS DOWN DOWNWARD DIRECTION PIECE | CROUCHING |
| FIRST BUTTON | PRESS DOWN | SHOOTING OF FIRST BEAM |
| FIRST BUTTON | RELEASE AFTER LONG PRESS | CHARGING AND SHOOTING OF FIRST BEAM |
| CROSS KEY + FIRST BUTTON | PRESS DOWN UPWARD DIRECTION PIECE + PRESS DOWN | SHOOTING OF SECOND BEAM |
| SECOND BUTTON | PRESS DOWN | JUMPING |
| A-BUTTON | PRESS DOWN | PULLING OF VIRTUAL CAMERA |
| ACCELERATION SENSOR | TILT | CHANGING OF AIMING DIRECTION OF GUN |
| ⋮ | ⋮ | ⋮ |

FIG. 20

| OPERATION MEANS | OPERATION METHOD | GAME CONTROL PROCESS |
|---|---|---|
| IMAGE CAPTURE INFORMATION COMPUTING SECTION | POINT OUT | MOVEMENT OF GUN SIGHT |
| B-BUTTON + IMAGE CAPTURE INFORMATION COMPUTING SECTION | PRESS DOWN + POINT OUT | MOVEMENT OF GUN SIGHT + MOVEMENT OF VIEWPOINT |
| A-BUTTON | PRESS DOWN | SHOOTING OF FIRST BEAM |
| A-BUTTON | RELEASE AFTER LONG PRESS | CHARGING AND SHOOTING OF FIRST BEAM |
| B-BUTTON + A-BUTTON | PRESS DOWN + RELEASE AFTER PRESSING DOWN | SHOOTING OF FIRST MISSILE |
| B-BUTTON + A-BUTTON | PRESS DOWN + RELEASE AFTER LONG PRESS | SHOOTING OF SECOND MISSILE |
| ACCELERATION SENSOR | SWING UP | JUMPING |
| ACCELERATION SENSOR | PULL | TURNING AROUND |
| B-BUTTON | PRESS DOWN | MOVEMENT OF VIEWPOINT TO HEAD PORTION |
| IMAGE CAPTURE INFORMATION COMPUTING SECTION + A-BUTTON + ACCELERATION SENSOR | POINT OUT + PRESS DOWN + SWING UP AND THEN DOWN | SHOOTING OF SECOND BEAM |
| ⋮ | ⋮ | ⋮ |

US 9,199,166 B2

GAME SYSTEM WITH VIRTUAL CAMERA CONTROLLED BY POINTING DEVICE

CROSS REFERENCE TO RELATED APPLICATION

The disclosure of Japanese Patent Application No. 2006-130727, filed May 9, 2006, is incorporated herein by reference.

BACKGROUND OF THE INVENTION

1. Field of the Invention

The present invention relates to a storage medium storing a game program, a game apparatus, and a game system. More particularly, the present invention relates to a storage medium storing a game program which is executed by a game apparatus which is operated using a pointing device capable of outputting data for remotely designating coordinates with respect to a predetermined detection surface, a game apparatus, and a game system.

2. Description of the Background Art

Conventionally, as disclosed in, for example, Japanese Laid-Open Patent Publication No. 11-90043 (hereinafter referred to as Patent Document 1), there is a game apparatus which is operated using a pointing device which remotely designates coordinates with respect to a display screen as a predetermined detection surface. In a video game disclosed in Patent Document 1, a game is progressed by using a gun 20 to designate a position on a display screen 3A and shoot a target. Also, by operating a foot switch 70, a viewpoint of a game image displayed on the display screen 3A is changed.

Also, as disclosed in, for example, Japanese Laid-Open Patent Publication No. 7-116343 (hereinafter referred to as Patent Document 2) and Japanese Laid-Open Patent Publication No. 11-272841 (hereinafter referred to as Patent Document 3), there is another game apparatus in which a viewpoint of a game image displayed on a display screen is changed. An electronic amusement apparatus disclosed in Patent Document 2 detects an attitude of a player, and based on the attitude, changes a viewpoint of a game image displayed on a display screen. A video game apparatus disclosed in Patent Document 3 changes a viewpoint of a game image displayed on a display screen, depending on, for example, a displayed position and behavior of a player character. Specifically, depending on a player's operation, the video game apparatus uses an overhead viewpoint (a viewpoint in a game space position above and behind a player character) when the player character is being moved in the game space, a subjective viewpoint (a viewpoint in the game space substantially coinciding with a position of the player character) when the player character is stopped, and similarly a subjective viewpoint when the player character infiltrates a specific place in the game space.

On the other hand, there is a game apparatus in which a method of operating the apparatus is changed instead of changing a viewpoint of a game image, as disclosed in, for example, Japanese Laid-Open Patent Publication No. 10-235014 (hereinafter referred to as Patent Document 4), Japanese Laid-Open Patent Publication No. 2001-109714 (hereinafter referred to as Patent Document 5), and Japanese Laid-Open Patent Publication No. 2003-251070 (hereinafter referred to as Patent Document 6). Patent Document 4 discloses a hand-held liquid crystal game apparatus in which a method of operating the apparatus is changed, depending on whether a game to be executed is a game for a portrait screen or a game for a landscape screen. Patent Document 5 discloses an information distribution apparatus in which a key operation and a response to the operation are defined by the user, thereby changing an operation method. Patent Document 6 discloses a game apparatus in which a game control which is performed, corresponding to an operation signal which is generated, depending on a player's operation, is changed, depending on an attitude of an operation section 50.

However, in the video game disclosed in Patent Document 1, it is necessary to operate a foot switch so as to change the viewpoint of the game image displayed on the display screen, resulting in poor operability. Also, in the electronic amusement apparatus disclosed in Patent Document 2 and the video game apparatus disclosed in Patent Document 3, a game input is performed by the player operating a key, a joystick or the like, and therefore, this technique cannot be directly applied to a game apparatus which is operated using a pointing device which remotely designates coordinates with respect to a detection surface.

In the hand-held liquid crystal game apparatus disclosed in Patent Document 4, the operation method is changed, depending on the type of a game executed by the game apparatus, i.e., the operation method is not changed as appropriate during execution of the same game. In the information distribution apparatus disclosed in Patent Document 5, the user needs to define a key operation and a response to the key operation for each game type, resulting in a complicated operation. In the game apparatus disclosed in Patent Document 6, a game input is performed by the player operating a direction key, a button or the like, and therefore, this technique cannot be directly applied to a game apparatus which is operated using a pointing device which remotely designates coordinates with respect to a detection surface.

SUMMARY OF THE INVENTION

Therefore, an object of the present invention is to solve at least one of the above-described problems, and provide a storage medium storing a game program for appropriately changing a viewpoint of a game image displayed on a display screen, a game process (an operation method, etc.), or the like, in a game apparatus which is operated using a pointing device capable of outputting data for remotely designating coordinates with respect to a predetermined detection surface, a game apparatus, and a game system.

The present invention has the following features to attain the object mentioned above. Note that reference numerals, step numbers and the like inside parentheses indicate correspondence to embodiments described below for the sake of easy understanding, and do not limit the present invention.

A first aspect of the present invention is directed to a storage medium storing a game program (GP) which is executed by a computer (30) of a game apparatus (3) using a pointing device (7, 74, 8) capable of outputting data for remotely designating coordinates with respect to a predetermined detection surface. The game program causes the computer to execute a coordinate obtaining step (S51), a designated coordinate-related process step (S90 to S93), a designated coordinate-unrelated process step (S86, S87, S92, S93), a detection step (S54), and a switching step (S55 to S85, S88, S89). The coordinate obtaining step obtains coordinates (Db3) on the detection surface using the data output from the pointing device. The designated coordinate-related process step performs a designated coordinate-related process which is a game process which employs the coordinates obtained in the coordinate obtaining step (FIGS. 16, 17, 20). The designated coordinate-unrelated process step performs a designated coordinate-unrelated process which is a game process which does not employ the coordinates obtained in the coordinate obtaining step (FIGS. 14, 15, 19). The detection step detects whether or not coordinates within a predetermined region (range) of the detection surface have been obtained in the coordinate obtaining step (FIGS. 10 to 12 when Yes; FIGS. 8, 9 when No). The switching step switches between the designated coordinate-related process step and the designated coordinate-unrelated process step, depending on a result of the detection by the detection step.

The pointing device can output data for designating coordinates with respect to a predetermined detection surface remotely (i.e., from a position away from the detection surface). Representatively, the pointing device outputs data for obtaining a position on the detection surface pointed out by a housing held by a player. For example, the pointing device output data for obtaining a position (i.e., coordinates in a detection coordinate system set on the detection surface) where a straight line extending from a predetermined position (an end portion, etc.) of the housing held by the player toward a predetermined direction (e.g., a direction determined depending on an attitude of the housing (a longitudinal direction of the housing, etc.), etc.) intersects the predetermined detection surface. Also, a relationship between the detection output data from the pointing device and designated coordinates is preferably fixed (i.e., rather than determination of a change of data output from the pointing device with respect to the previously obtained designated coordinates, designated coordinates are preferably obtained uniquely or in one-to-one correspondence, depending on data output from the pointing device). Also, the detection surface may be a display screen on which a game image is displayed, or may be different from the display screen. In the latter case, it is preferable to set a correspondence relationship between coordinate on the detection surface and coordinates on the display screen (in other words, whereas coordinates on the display screen are directly detected in the former case, coordinates on a detection surface different from the display screen are detected and are then converted into coordinates on the display screen in the latter case). When the detection surface is the same as the display screen, the detectable maximum region may be the same as, larger than, or smaller than the display screen (or a display region in which a game image is displayed). Also, when the detection surface may be the same as, larger than, or smaller than the display screen, the predetermined region may be the same as the display screen (or a display region in which a game image is displayed). Also, the "predetermined region" may be smaller than or the same as the detectable maximum region. In the latter case, the detection step detects whether or not coordinates have been obtained in the coordinate obtaining step.

The pointing device may calculate designated coordinates using hardware or by subjecting a detection value detected by hardware to a software process. In the latter case, the software process may be performed by software included in the pointing device or by a software process in the game application.

The designated coordinate-related process step, only when coordinates within the predetermined region have been obtained in the coordinate obtaining step, may perform a game process using the obtained coordinates. In this case, a predetermined region (first region) which is used for determination in the detection step may or may not be the same as a predetermined region (second region) which is used for a game process in the designated coordinate-related process step. When they are not the same, the first region is preferably a region which includes the second region and further includes a peripheral region of the second region. For example, the first region may be a detectable maximum region (in this case, the detection step determines whether or not coordinates have been obtained), and the second region may be a display region in which a game image is displayed. Note that the predetermined detection surface may be a surface which is not actually present and is virtually set in a real space, or a surface which is actually present, such as a display screen or the like.

In a second aspect based on the first aspect, in the detection step, it is detected whether or not coordinates on the detection surface have been obtained in the coordinate obtaining step (S52).

In a third aspect based on the first aspect the game program causes the computer to further execute a display control step (S93). The display control step displays on a display screen a game image as viewed from a virtual camera (C) provided in a virtual three-dimensional game space (S). The designated coordinate-unrelated process step includes a first virtual camera control step (S86). The first virtual camera control step determines a parameter of the virtual camera by performing a first computation based on a game parameter (Ph) (FIG. 15). The designated coordinate-related process step includes a second virtual camera control step (S90). The second virtual camera control step determines a parameter of the virtual camera by performing a second computation different from the first computation based on a game parameter (FIG. 17).

In a fourth aspect based on the first aspect, the game program causes the computer to further execute a display control step. The display control step displays on a display screen a game image as viewed from a virtual camera provided in a virtual three-dimensional game space. The designated coordinate-unrelated process step includes a first virtual camera control step. The first virtual camera control step determines a parameter of the virtual camera so that a game image is obtained as a player character present in the virtual three-dimensional game space is objectively viewed. The designated coordinate-related process step includes a second virtual camera control step. The second virtual camera control step determines a parameter of the virtual camera so that a game image is obtained as the player character subjectively views the virtual three-dimensional game space. Note that, typically, in the first virtual camera control step, images of the player character and the virtual game space in all directions of the player character are captured, and in the second virtual camera control step, an image of the virtual game space in a predetermined direction (a direction covering a range of no more than 180°) from a position of the player character is captured.

In a fifth aspect based on the first aspect, the game program causes the computer to further execute a display control step. The display control step displays on a display screen a game image as viewed from a virtual camera provided in a virtual three-dimensional game space. The designated coordinate-unrelated process step includes a first virtual camera control step. The first virtual camera control step determines a parameter of the virtual camera so that a focusing point of the virtual camera substantially coincides with a position (Ph) of a player character. The designated coordinate-related process step includes a second virtual camera control step. The second virtual camera control step determines a parameter of the virtual camera so that a viewpoint of the virtual camera substantially coincides with a position of the player character. Note that, in the designated coordinate-unrelated process step, the parameter of the virtual camera is preferably determined so that a distance between the focusing point of the virtual camera and the position of the player character is smaller than a distance between the viewpoint of the virtual camera and the position of the player character in the three-dimensional virtual game space, and in the designated coordinate-related process step, the parameter of the virtual camera is preferably determined so that the distance between the viewpoint of the virtual camera and the position of the player character is smaller than the distance between the focusing point of the virtual camera and the position of the player character.

In a sixth aspect based on the first aspect, the game program causes the computer to further execute a display control step. The display control step displays on a display screen a game image as viewed from a virtual camera provided in a virtual three-dimensional game space. The designated coordinate-unrelated process step determines a parameter of the virtual camera so that a distance from a viewpoint of the virtual camera to a position of a player character is longer than the distance determined in the designated coordinate-related process step.

In a seventh aspect based on the first aspect, the game program causes the computer to further execute a display control step. The display control step displays on a display screen a game image as viewed from a virtual camera provided in a virtual three-dimensional game space. The designated coordinate-unrelated process step determines a parameter of the virtual camera so as to generate a game image as the virtual three-dimensional game space is viewed in a direction traverse to a traveling direction or an orientation (Pd) of a player character. The designated coordinate-related process step determines a parameter of the virtual camera so as to generate a game image as the virtual three-dimensional game space is viewed in the traveling direction or the orientation of the player character. Note that, in the designated coordinate-unrelated process step, a direction in which the orientation of the virtual camera is projected on a virtual horizontal plane is caused to be substantially perpendicular to a direction in which the traveling direction or the orientation of the player character (a direction in which the face or body faces) is projected on the virtual horizontal plane, and in the designated coordinate-related process step, these two projection directions are caused to be the same.

In an eighth aspect based on the first aspect, the pointing device comprises a direction designating section (72). The direction designating section is capable of designating a direction by a player's operation in addition to the pointing operation of remotely designating coordinates. In the designated coordinate-unrelated process step, a movement of a player character is controlled in a virtual three-dimensional game space, depending on operation data from the direction designating section.

In a ninth aspect based on the first aspect, the pointing device comprises an input section (72, 701). The input section is capable of detecting a player's operation in addition to the pointing operation (74) of remotely designating coordinates. In the designated coordinate-unrelated process step, a predetermined game process is executed as the designated coordinate-unrelated process, based on operation data generated by the input section (FIG. 19). In the designated coordinate-related process step, a game process different from the predetermined game process is executed based on the same operation data generated by the input section in addition to the designated coordinate-related process (FIG. 20). The pointing device includes a housing which is held by the player. The housing is preferably provided with the input section. The "input section" is, for example, an operation switch or a cross key for detecting a press operation, a joystick for detecting a tilt operation, a touch panel for detecting a touch operation, an acceleration sensor for detecting an acceleration generated in the housing, depending on a player's operation to moving the housing, or the like. The input section may be provided on a surface of or inside the housing. The "input section" is preferably an operation section employing a device capable of independently detecting a player's operation (i.e., an operation section employing a device which is provided on or in the housing and is capable of detecting a player's operation by itself without using another device provided outside the housing).

In a tenth aspect based on the first aspect, the pointing device includes a housing (71) which is held by a player. A first input section and a second input section (72) whose operations by the player are detectable are provided at different positions of a surface of the housing. In the designated coordinate-unrelated process step, a predetermined game process is executed as the designated coordinate-unrelated process, based on operation data generated by the first input section. In the designated coordinate-related process step, the same game process as the predetermined game process is executed based on operation data generated by the second input section, in addition to the designated coordinate-related process.

In an eleventh aspect based on the tenth aspect, in the designated coordinate-related process step, a game process different from the predetermined game process is further executed based on the operation data generated by the first input section.

In a twelfth aspect based on the first aspect, the pointing device comprises an input section. The input section is capable of detecting a player's operation in addition to the pointing operation of remotely designating coordinates. In the designated coordinate-related process step, as the designated coordinate-related process, a predetermined game parameter is determined based on the coordinates obtained by the coordinate obtaining step. In the designated coordinate-unrelated process step, as the designated coordinate-unrelated process, the game parameter is determined based on operation data generated by the input section.

In a thirteenth aspect based on the twelfth aspect, the game parameter is a direction parameter indicating a direction in a virtual three-dimensional game space. The input section is an input section capable of designating a direction. In the designated coordinate-related process step, as the designated coordinate-related process, the direction parameter is determined based on the coordinates obtained in the coordinate obtaining step. In the designated coordinate-unrelated process step, as the designated coordinate-unrelated process, the direction parameter is determined based on the direction designated by the input section. Note that, in the designated coordinate-unrelated process, for example, the direction parameter is determined, depending on an output of an acceleration sensor, a tilt sensor, or a direction sensor (i.e., a direction parameter in the virtual world is determined, depending on an acceleration in a real world detected by the acceleration sensor, or an angular velocity or a direction in a real world detected by the tilt sensor and the direction sensor), the direction parameter is determined, depending on a tilt of a joystick, or a change in the direction parameter is determined. Also, in the designated coordinate-related process, for example, the direction parameter in the virtual game space is determined based on a position of the player character in the virtual three-dimensional game space, and a position in the virtual three-dimensional game space coinciding with screen coordinates corresponding to coordinates obtained depending on data output from the pointing device (e.g., a direction connecting both the positions).

In a fourteenth aspect based on the first aspect, the detection surface is set with respect to a display screen (2) on which a game image is displayed. The pointing device is capable of outputting data for remotely designating coordinates with respect to the display screen. The game program causes the computer to further execute a display control step and a game space coordinate calculating step (S92). The display control step displays a game image representing a game space on the display screen. The game space coordinate calculating step calculates corresponding coordinates (Dc1) in the game space with which the coordinates obtained in the coordinate obtaining step coincide on the game image. In the designated coordinate-related process step, as the designated coordinate-related process, a process is performed, depending on the position in the virtual three-dimensional game space calculated in the game space coordinate calculating step.

In a fifteenth aspect based on the first aspect, the pointing device further comprises an input section. The input section generates operation data, depending on a player's operation, in addition to the pointing operation of remotely designating coordinates. In the designated coordinate-related process step, in addition to the designated coordinate-related process, a game process different from the game process of the designated coordinate-related process is performed based on the operation data from the input section. In the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected. In the switching step, even assuming that the transition has been detected in the detection step, when predetermined operation data is output from the input section, the designated coordinate-related process step is not switched to the designated coordinate-unrelated process step, so that the designated coordinate-related process step continues to be executed.

In a sixteenth aspect based on the first aspect, the pointing device further comprises an input section. The input section generates operation data, depending on a player's operation, in addition to the pointing operation of remotely designating coordinates. In the designated coordinate-unrelated process step, as the designated coordinate-unrelated process, a game process is performed based on the operation data from the input section. In the detection step, a transition from a state in which it is not detected that coordinates have been obtained within a predetermined region of the detection surface in the coordinate obtaining step, to a state in which it is detected that coordinates have been obtained within a predetermined region of the detection surface in the coordinate obtaining step, is detected. In the switching step, even assuming that the transition has been detected in the detection step, when predetermined operation data is output from the input section, the designated coordinate-unrelated process step is not switched to the designated coordinate-related process step, so that the designated coordinate-unrelated process step continues to be executed.

In the seventeenth aspect based on the first aspect, the pointing device further comprises an input section. The input section generates operation data, depending on a player's operation, in addition to the pointing operation of remotely designating coordinates. The game program causes the computer to further execute a display control step. The display control step displays on a display screen a game image as viewed from a virtual camera provided in a virtual three-dimensional game space. In the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected. In the switching step, assuming that the transition has been detected in the detection step, when predetermined operation data is output from the input section, the designated coordinate-related process step is not switched to the designated coordinate-unrelated process step, so that the designated coordinate-related process step continues to be executed, and a line-of-sight direction of the virtual camera is changed, depending on the coordinates obtained in the coordinate obtaining step. Note that, when coordinates have not been obtained in the coordinate obtaining step, the line-of-sight direction of the virtual camera may be changed based on latest obtained coordinates. Alternatively, the line-of-sight direction of the virtual camera may be changed based on latest coordinates within the predetermined region obtained in the coordinate obtaining step. Also, the line-of-sight direction may be changed while leaving the position of the virtual camera viewpoint as it is.

In an eighteenth aspect based on the first aspect, the game program causes the computer to further execute a player character action control step (S92). The player character action control step causes a player character existing in a virtual game world to perform an action, depending on a player's operation. In the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected. In the switching step, assuming that the transition has been detected in the detection step, when the player character is performing a specific action, the designated coordinate-related process step is not switched to the designated coordinate-unrelated process step, so that the designated coordinate-related process step continues to be executed.

In a nineteenth aspect based on the first aspect, the pointing device includes a housing which is held by a player. The housing is provided with a motion sensor. The game program causes the computer to further execute a data obtaining step (S51) and a motion processing step. The data obtaining step obtains data (Da4) detected and output by the motion sensor. The motion processing step performs a predetermined game process based on data obtained in the motion data obtaining step. In the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected. In the switching step, even assuming that the transition has been detected in the detection step, when the motion sensor indicates an output having a predetermined threshold value or more, the designated coordinate-related process step is not switched to the designated coordinate-unrelated process step, so that the designated coordinate-related process step continues to be executed. Note that the motion sensor can detect data from which a motion of the motion sensor itself or a housing in which the motion sensor is housed can be obtained. For example, the motion sensor is an acceleration sensor which detects an acceleration in a predetermined linear direction which is generated in the housing.

A twentieth aspect of the present invention is directed to a game apparatus employing a pointing device capable of outputting data for remotely designating coordinates with respect to a predetermined detection surface. The game apparatus comprises a coordinate obtaining means, a designated coordinate-related process means, a designated coordinate-unrelated process means, a detection means, and a switching means. The coordinate obtaining means obtains coordinates on the detection surface using the data output from the pointing device. The designated coordinate-related process means performs a designated coordinate-related process which is a game process which employs the coordinates obtained by the coordinate obtaining means. The designated coordinate-unrelated process means performs a designated coordinate-unrelated process which is a game process which does not employ the coordinates obtained by the coordinate obtaining means. The detection means detects whether or not coordinates within a predetermined region of the detection surface have been obtained by the coordinate obtaining means. The switching means switches between the designated coordinate-related process means and the designated coordinate-unrelated process means, depending on a result of the detection by the detection means.

A twenty-first aspect of the present invention is directed to a game system including game apparatus employing a pointing device capable of outputting data for remotely designating coordinates with respect to a predetermined detection surface. The pointing device includes a housing which is held by a player, the housing being longer than it is wide, and the pointing device outputs data for obtaining as designated coordinates a position where a straight line extending from an end portion in a longitudinal direction of the pointing device intersects the detection surface. The housing is provided with operation keys on both side portions along the longitudinal direction. The game apparatus comprises a coordinate obtaining means, a designated coordinate-related process means, a designated coordinate-unrelated process means, a detection means, and a switching means. The coordinate obtaining means obtains coordinates on the detection surface based on the data output from the pointing device. The designated coordinate-related process means performs a designated coordinate-related process which is a game process which employs the coordinates obtained by the coordinate obtaining means. The designated coordinate-unrelated process means performs a designated coordinate-unrelated process which is a game process which does not employ the coordinates obtained by the coordinate obtaining means and employs operation data output from the operation keys on both the side portions. The detection means detects whether or not coordinates within a predetermined region of the detection surface have been obtained by the coordinate obtaining means. The switching means switches between the designated coordinate-related process means and the designated coordinate-unrelated process means, depending on a result of the detection by the detection means.

According to the first aspect, in a game in which a game process is performed by the player designating coordinate using a pointing device, modes having different game process contents are automatically changed, depending on an output of the pointing device. Therefore, various operation environments with good operability can be provided to the player.

According to the second aspect, modes having different game process contents are automatically changed, depending on an output of the pointing device (i.e., when coordinates have been obtained on the detection surface or when coordinates have not been obtained on the detection surface).

According to the third aspect, game images of different viewpoints are automatically changed, depending on an output of the pointing device. Therefore, various operation environments with good operability can be provided to the player.

According to the fourth to seventh aspects, a parameter of the virtual camera in the game space is changed, depending on an output of the pointing device. Therefore, for example, the player can readily switches between a subjective image and an objective image. Also, a game image in which a peripheral situation of a player character can be viewed and a game image in which a player character's view can be viewed are switched, depending on an output of the pointing device. Therefore, the player can switch game images with good operability, depending on the game situation.

According to the eighth aspect, when detection coordinates have not been obtained from an output of the pointing device, a player character can be moved using the direction designating section.

According to the ninth aspect, even when the same operation section is subjected to the same operation, different game processes are provided, depending on an output of the pointing device. Therefore, various operation environments with can be provided to the player. Also, for example, a game process can be appropriately assigned to an operation section, depending on a direction of the pointing device held by the player.

According to the tenth and eleventh aspects, the same game process is performed using different operation sections, depending on an output of the pointing device. Therefore, various operation environments with can be provided to the player. Also, for example, an operation section for designating a predetermined game process can be assigned to an operation section which is easily operated by the user, depending on a direction in which the player holds the pointing device.

According to the twelfth aspect, even when detection coordinates have not been obtained from an output of the pointing device, another input section can be used to perform a similar game process.

According to the thirteenth aspect, assuming that a direction parameter is calculated, depending on detection coordinates obtained from an output of the pointing device, even when the detection coordinates have not been obtained, another input section can be used to perform a similar game process.

According to the fourteenth aspect, it is possible to provide a game operation of directly designating a position in the game space, depending on detection coordinates obtained from an output of the pointing device.

According to the fifteenth and sixteenth aspects, when the player is performing an operation section, a game process is not changed, thereby making it possible to prevent confusion in a player's operation.

According to the seventeenth aspect, a line-of-sight direction can be simultaneously changed by designating coordinate (e.g., outside the display screen) while operating a predetermined operation section.

According to the eighteenth aspect, when a player character is performing a specific action, a game process is not changed, thereby making it possible to prevent confusion in a player's operation.

According to the nineteenth aspect, when the player is moving the whole pointing device so that an acceleration or the like is generated (e.g., the pointing device is swung up, etc.), a coordinate designated position of the pointing device may depart from a predetermined region. If a game process is transitioned in response to the departing, confusion occurs in a player's operation. Therefore, by prohibiting a transition when acceleration data indicates an output having a predetermined threshold value or more (an acceleration, etc.), such a change in game process can be prevented.

Further, according to the game apparatus and the game system of the present invention, an effect similar to that of the above-described storage medium storing the game program can be obtained.

Furthermore, a game operation can be performed with good operability by longitudinally holding the pointing device to designate coordinates, a game operation can also be performed with good operability by laterally holding the pointing device to use operation keys on both side portions, and appropriate game processes can be switched-automatically in association with a natural motion when switching between longitudinal holding and lateral holding.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram illustrating a configuration of the controller 7 of FIG. 3;

FIG. 8 is a diagram for generally describing a state in which a player performs a game operation using the controller 7 of FIG. 3 in a first operation mode;

FIG. 13 is a diagram for describing view angles of markers 8L and 8R and an image capture information computing section 74;

FIG. 14 is a diagram illustrating an exemplary objective game image which is displayed on a monitor 2 in the first operation mode;

FIG. 17 is a schematic diagram illustrating a position of the virtual camera C in a subjective image, as viewed from a side of the player character P;

FIG. 19 is a diagram illustrating exemplary first operation table data Dc4 stored in the main memory 33;

FIG. 20 is a diagram illustrating exemplary second operation table data Dc5 stored in the main memory 33;

DESCRIPTION OF THE PREFERRED EMBODIMENTS

Figure 1:
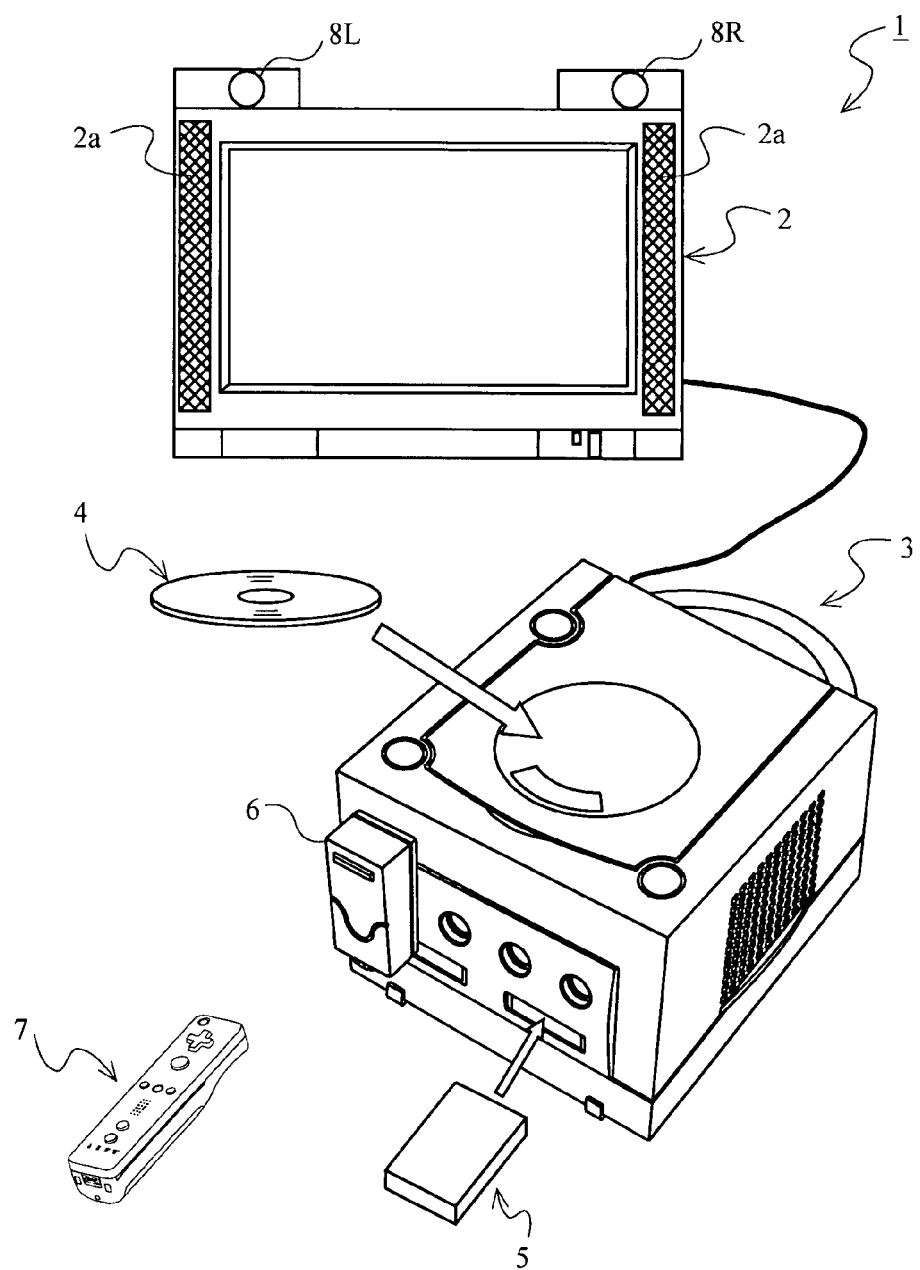
FIG. 1 is an external view for describing a game system 1 according to an embodiment of the present invention.

A game system 1 according to an embodiment of the present invention will be described with reference to FIG. 1. Note that FIG. 1 is an external view for describing the game system 1. Hereinafter, the game system 1 will be described, illustrating a stationary game apparatus as an example.

In FIG. 1, the game system 1 is comprised of a stationary game apparatus (hereinafter simply referred to as a game apparatus) 3 which is connected via a connection cord to a display (hereinafter referred to as a monitor) 2 with a loudspeaker 2a, such as a television set for home use or the like, and a controller 7 which inputs operation information to the game apparatus 3. The game apparatus 3 is connected via a connection terminal to a reception unit 6. The reception unit 6 receives transmission data wirelessly transmitted from the controller 7, so that the controller 7 and the game apparatus 3 are connected together via wireless communication. An optical disc 4 which is an exemplary information storing medium changeable with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory which fixedly stores saved data or the like, is detachably attached to the game apparatus 3 as required. The game apparatus 3 executes a game program or the like stored on the optical disc 4, and displays a result of the execution as a game image on the monitor 2. The game apparatus 3 can also reproduce a game state which was executed in the past, using saved data stored in the external memory card 5, and display a resultant game image on the monitor 2. The player of the game apparatus 3 can enjoy events of the game by operating the controller 7 while watching a game image displayed on the monitor 2.

The controller 7 wirelessly transmits transmission data from a communication section 75 (described below) included therein to the game apparatus 3 to which the reception unit 6 is connected, using, for example, the Bluetooth (R) technique. The controller 7 is an operation means for mainly operating a player object appearing in a game space displayed on the monitor 2. The controller 7 is provided with an operation section including a plurality of operation buttons, keys, sticks and the like. As described below, the controller 7 also comprises an image capture information computing section 74 for capturing an image viewed from the controller 7. As exemplary targets whose images are to be captured by the image capture information computing section 74, two LED modules (hereinafter referred to as markers) 8L and 8R are provided in the vicinity of the display screen of the monitor 2. The markers 8L and 8R each emit infrared light toward the front of the monitor 2.

Next, a configuration of the game apparatus 3 will be described with reference to FIG. 2. Note that FIG. 2 is a functional block diagram of the game apparatus 3.

Figure 2:
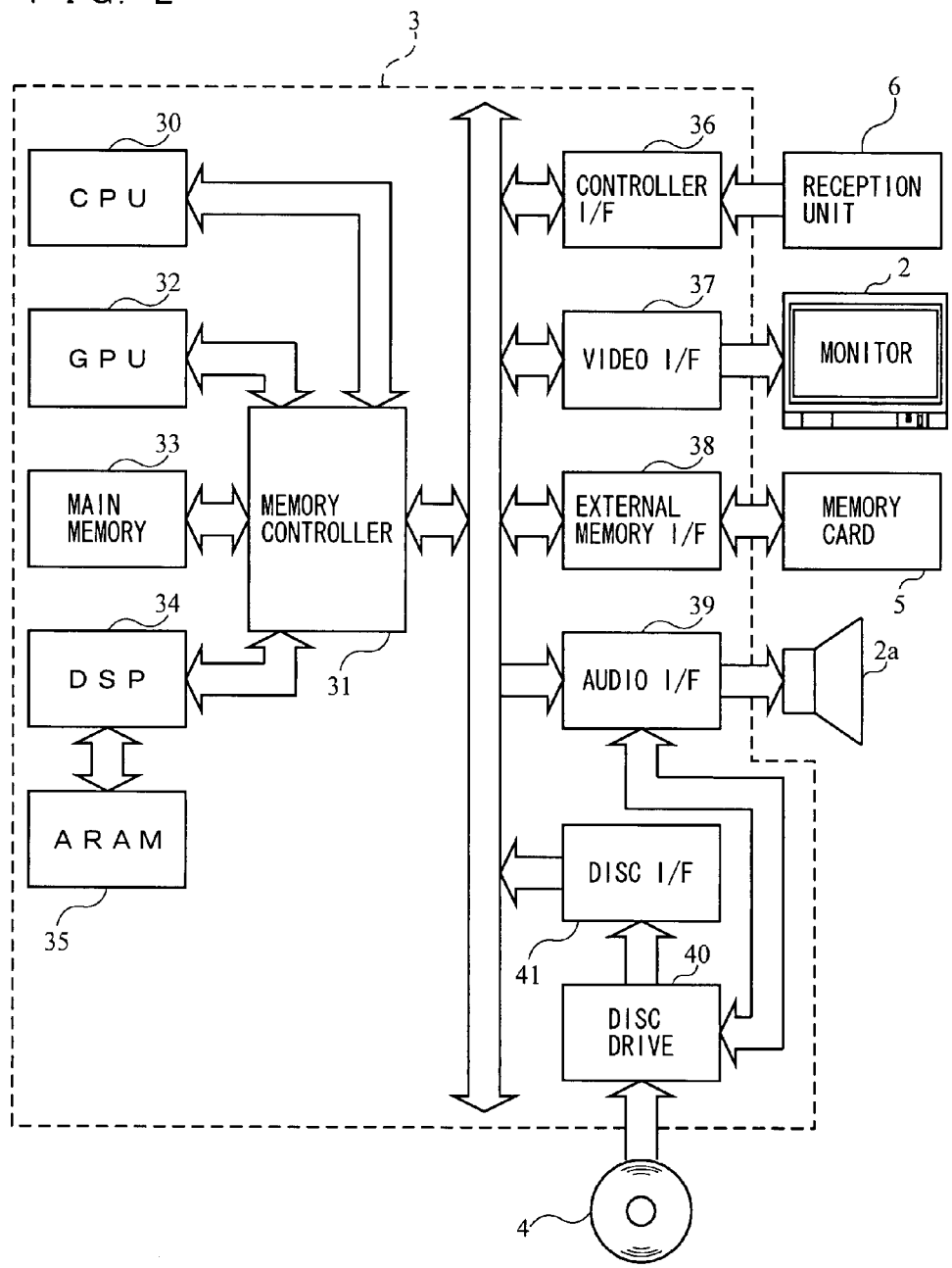
FIG. 2 is a functional block diagram of a a game apparatus 3 of FIG. 1.

In FIG. 2, the game apparatus 3 comprises, for example, a RISC CPU (central processing unit) 30 which executes various programs. The CPU 30 executes a boot program stored in a boot ROM (not shown) and performs, for example, initialization of memories, such as a main memory 33 and the like, before executing a game program stored in the optical disc 4, and performing, for example, a game process corresponding to the game program. A GPU (Graphics Processing Unit) 32, the main memory 33, a DSP (Digital Signal Processor) 34, and an ARAM (Audio RAM) 35 are connected via a memory controller 31 to the CPU 30. A controller I/F (interface) 36, a video I/F 37, an external memory I/F 38, an audio I/F 39, and a disc I/F 41 are connected via a predetermined bus to the memory controller 31. The reception unit 6, the monitor 2, the external memory card 5, a loudspeaker 2*a*, and a disc drive 40 are connected to the controller I/F 36, the video I/F 37, the external memory I/F 38, the audio I/F 39, and the disc I/F 41, respectively.

The GPU 32 performs image processing based on an instruction from the CPU 30, and is comprised of, for example, a semiconductor chip which performs a calculation process required for 3D graphics display. The GPU 32 performs image processing using a memory specialized for image processing or a memory area which is a portion of the main memory 33. The GPU 32 uses these to generate game image data or movie video to be displayed on the monitor 2, and outputs the data via the memory controller 31 and the video I/F 37 to the monitor 2 as appropriate.

The main memory 33 is a memory area used in the CPU 30, which stores a game program or the like required for a process by the CPU 30 as appropriate. For example, the main memory 33 stores a game program, various data or the like read from the optical disc 4 by the CPU 30. The game program, the various data or the like stored in the main memory 33 is executed by the CPU 30.

The DSP 34 processes sound data or the like which is generated in the CPU 30 when a game program is executed. The ARAM 35 for storing the sound data or the like is connected to the DSP 34. The ARAM 35 is used when the DSP 34 performs a predetermined process (e.g., storage of a read-ahead game program or sound data) The DSP 34 reads sound data stored in the ARAM 35, and outputs the data via the memory controller 31 and the audio I/F 39 to the loudspeaker 2*a* included in the monitor 2.

The memory controller 31 performs a centralized control of data transfer. The above-described various I/Fs are connected to the memory controller 31. The controller I/F 36 is comprised of, for example, four controller I/Fs 36*a* to 36*d*, and communicably connects an external apparatus which can be engaged with the four controller I/Fs 36*a* to 36*d* via connectors thereof, and the game apparatus 3. For-example, the reception unit 6 is engaged with the connector to be connected via the controller I/F 36 to the game apparatus 3. As described above, the reception unit 6 receives transmission data from the controller 7, and outputs the transmission data via the controller I/F 36 to the CPU 30. The monitor 2 is connected to the video I/F 37. The external memory card 5 is connected to the external memory I/F 38, thereby making it possible to access the backup memory or the like provided in the external memory card 5. The loudspeaker 2*a* included in the monitor 2 is connected to the audio I/F 39 so that sound data read from the ARAM 35 by the DSP 34 or sound data directly output from the disc drive 40 can be output from the loudspeaker 2*a*. The disc drive 40 is connected to the disc I/F 41. The disc drive 40 reads data stored at a predetermined read-out position on the optical disc 4, and outputs the data to the bus and the audio I/F 39 of the game apparatus 3.

Figure 3:
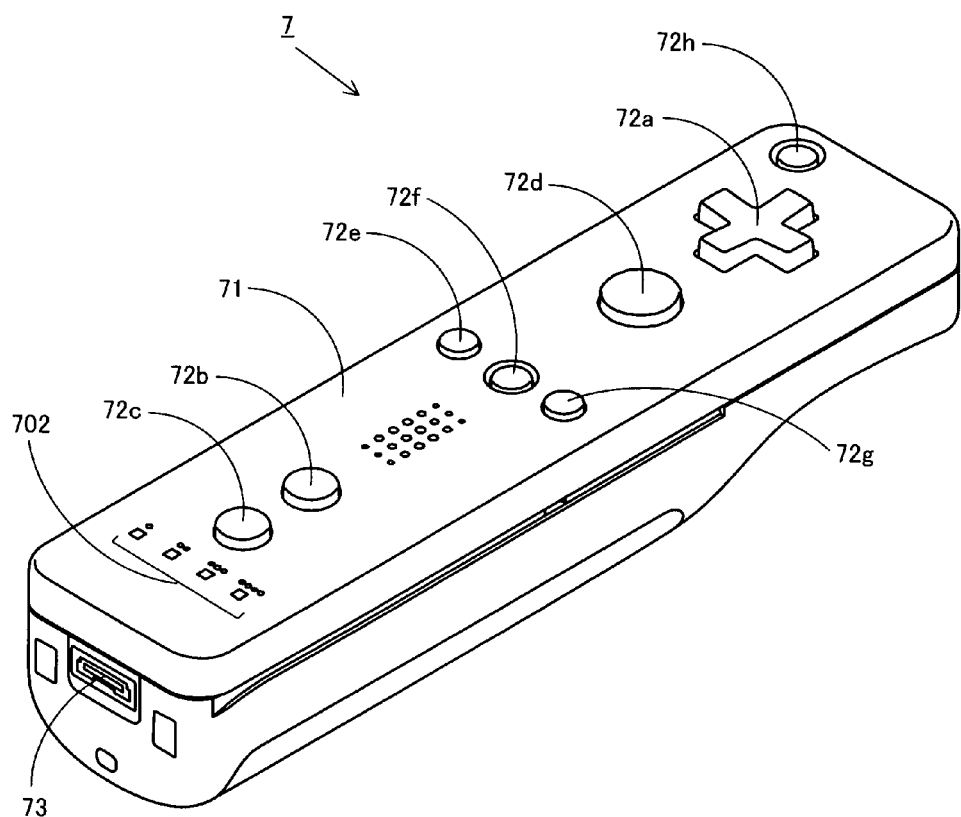
FIG. 3 is a perspective view of a controller 7 of FIG. 1 as viewed from the top and the rear.
Figure 4:
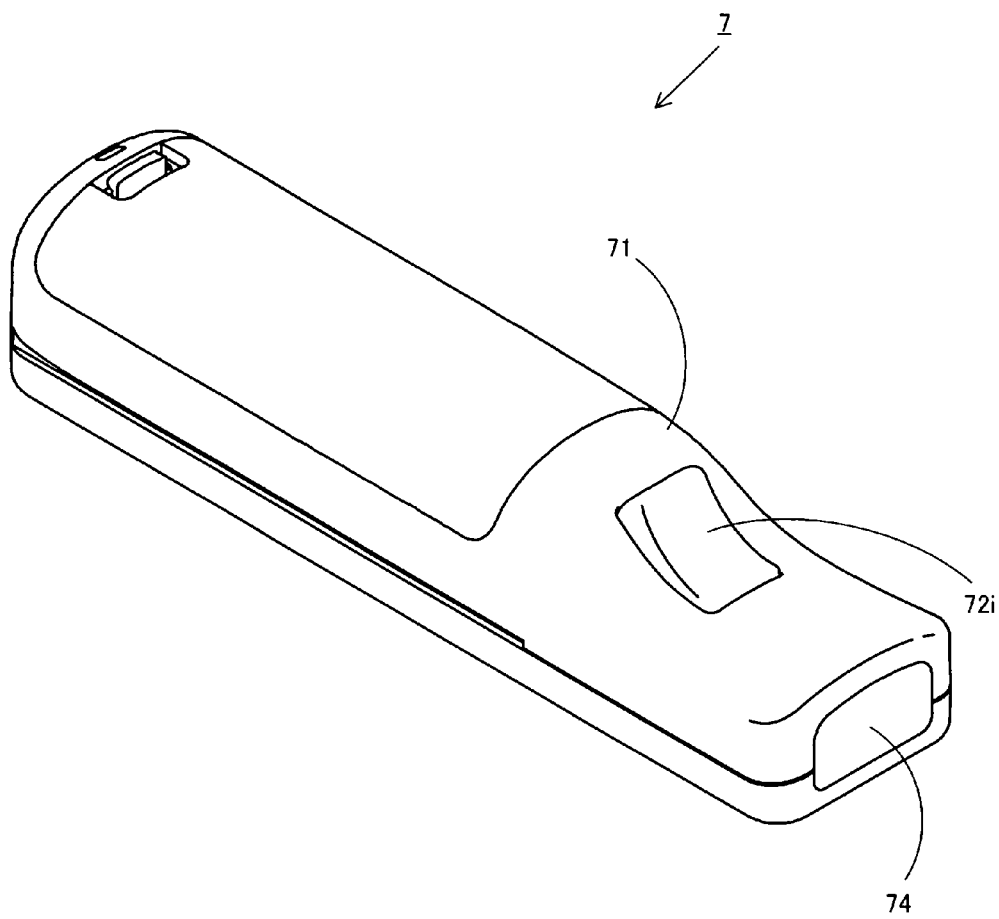
FIG. 4 is a perspective view of the controller 7 of FIG. 3 as viewed from the bottom and the front.

The controller 7 will be described with reference to FIGS. 3 and 4. FIG. 3 is a perspective view of the controller 7 as viewed from the top and the rear. FIG. 4 is a perspective view of the controller 7 as viewed from the bottom and the front.

In FIGS. 3 and 4, the controller 7 has a housing 71 formed by, for example, plastic molding. The housing 71 is provided with a plurality of operation sections 72. The housing 71 is in the shape of substantially a rectangular parallelepiped where a front-to-rear direction is a longitudinal direction. The whole housing 71 has a size which allows an adult and a child to hold the controller 7 with one hand.

A cross key 72*a* is provided on a central portion closer to a front side of an upper surface of the housing 71. The cross key 72*a* is a four-direction press switch in the shape of a cross, and has operation portions corresponding to the respective four directions (frontward, rearward, leftward, and rightward) indicated by arrows, the operation portions being provided at the respective projecting pieces of the cross arranged at intervals of 90°. Any of the frontward, rearward, leftward, and rightward directions is selected by the player pressing down any of the operation portions of the cross key 72*a*. For example, by the player operating the cross key 72*a*, the player can designate a direction in which a player character, a cursor or the like is to be moved.

Note that the cross key 72*a* is an operation section which outputs an operation signal, depending on the above-described direction input operation of the player, or may be an operation section in other forms. For example, an operation section may be provided in which four press switches are disposed in cross directions, and an operation signal is output, depending on a press switch pressed down by the player. In addition to the four press switches, a center switch may be provided at an intersection position of the cross directions, i.e., a complex operation section comprised of the four press switches and the center switch may be provided. Also, instead of the cross key 72*a*, an operation section may be provided which outputs an operation signal, depending on a tilt direction of a tiltable stick (so-called joystick) which projects from the upper surface of the housing 71. Also, instead of the cross key 72*a*, an operation section may be provided which outputs an operation. signal, depending on a slide direction of an disc-like member which can be moved in a horizontal direction. Also, a touch pad may be provided instead of the cross key 72*a*.

A plurality of operation buttons 72*b* to 72*g* are provided at the rear of the cross key 72*a* on the upper surface of the housing 71. The operation buttons 72*b* to 72*g* are operation sections which output operation signals assigned to the respective operation buttons 72*b* to 72*g* when the player presses down the head portions of the respective buttons. For example, functions of a 1st button, a 2nd button, an A-button, and the like are assigned to the operation buttons 72*b* to 72*d*. Functions of a minus button, a home button, a plus button, and the like are assigned to the operation buttons 72*e* to 72*g*. The operation buttons 72*a* to 72*g* are assigned the respective functions, depending on a game program executed by the game apparatus 3. The assigned functions are changed, depending on a direction in which the controller 7 is operated, which will be described in more detail below). Note that, in the exemplary arrangement of FIG. 3, the operation buttons 72*b* to 72*d* are aligned on a central portion in a front-to-rear direction of the upper surface of the housing 71. The operation buttons 72*e* to 72*g* are aligned in a lateral direction on the upper surface of the housing 71 and between the operation buttons 72*b* and 72*d*. The operation button 72*f* is a button of a type whose upper surface is buried below the upper surface of the housing 71 so that the player is prevented from unintentionally and erroneously pressing down the button.

Also, an operation button 72*h* is provided at the front of the cross key 72*a* on the upper surface of the housing 71. The operation button 72*h* is a power supply switch which remotely switches ON/OFF a power supply for the game apparatus main body 5. The operation button 72*h* is also a button of the type whose upper surface is buried below the upper surface of the housing 71 so that a player is prevented from unintentionally and erroneously pressing down the button.

A plurality of LEDs 702 are provided at the rear of the operation button 72*c* of the upper surface of the housing 71. Here, the controller 7 is assigned controller identification (number) so as to distinguish it from other controllers 7. For example, the LEDs 702 are used so as to inform the player of controller identification currently set for the controller 7. Specifically, when transmission data is transmitted from the controller 7 to the communication unit 6, one of the LEDs 702 is turned ON, depending on the controller identification.

Also, sound holes through which sound is emitted from a loudspeaker (a loudspeaker 706 of FIG. 5) described below to the outside are formed between the operation button 72*b* and the operation buttons 72*e* to 72*g* on the upper surface of the housing 71.

On the other hand, a hollow portion is formed on a lower surface of the housing 71. The hollow portion on the lower surface of the housing 71 is formed at a position where the index finger or the middle finger of the player is placed when the player holds the controller 7 with one hand while directing a front surface of the controller 7 toward the markers 8L and 8R. An operation button 72*i* is provided on a rear slope surface of the hollow portion. The operation button 72*i* is an operation section which functions as, for example, a B-button. Note that, as will be described below, the operation button 72*i* is also assigned operation functions which are changed, depending on a direction in which the controller 7 is operated by-the player.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position, a size or the like of the place. The image capture information computing section 74 has, for example, a maximum sampling cycle of about 200 frames/sec, and therefore, can track and analyze a relatively high-speed movement of the controller 7. A detailed configuration of the image capture information computing section 74 will be described below. A connector 73 is provided on a rear surface of the housing 71. The connector 73 is, for example, a 32-pin edge connector which is utilized so as to be engaged and connected with a connection cable.

Figure 5:
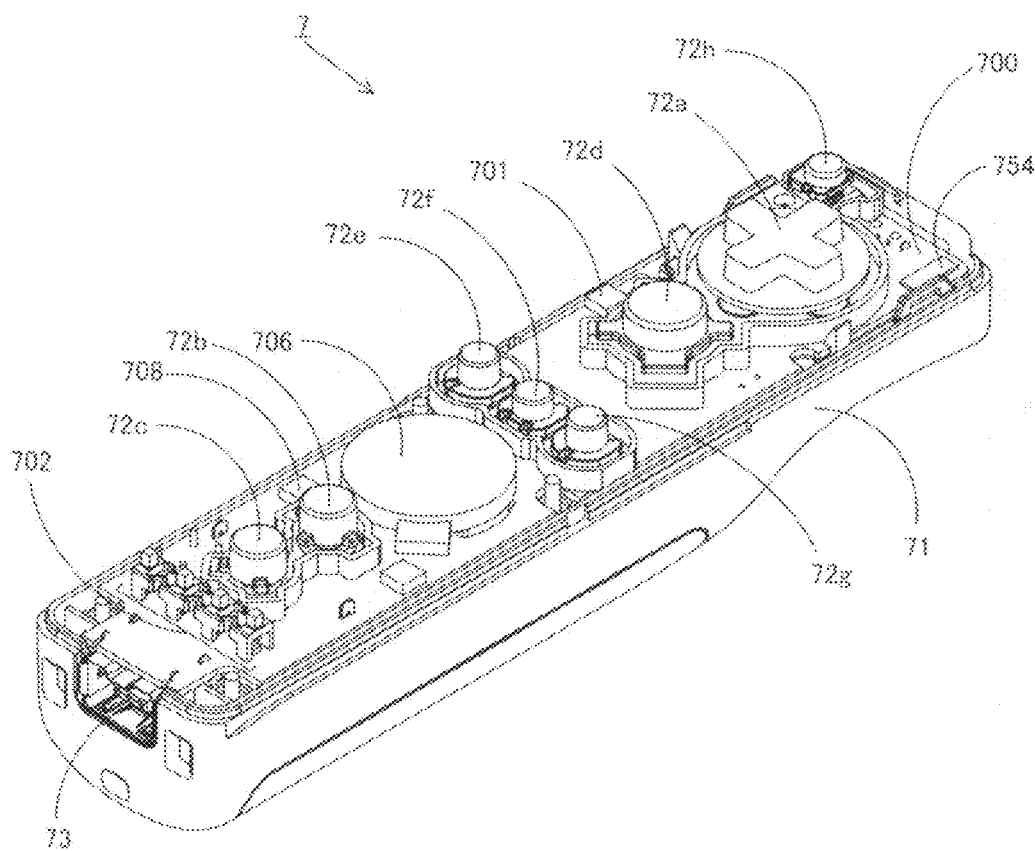
FIG. 5 is a perspective view of the controller 7 of FIG. 3 where an upper housing is cut away.
Figure 6:
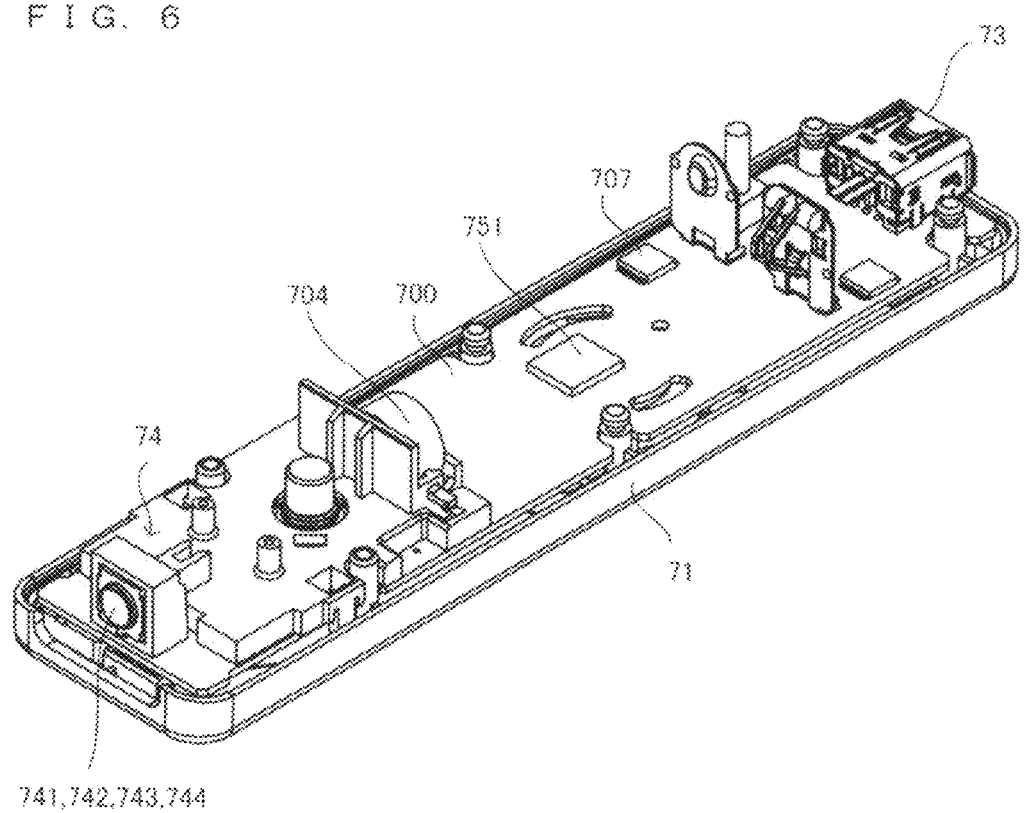
FIG. 6 is a perspective view of the controller 7 of FIG. 3 where a lower housing is cut away.

Next, an internal configuration of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 (as viewed from a front surface side thereof) where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72*a* to 72*h*, an acceleration sensor 701, the LEDs 702, an antenna 754, and the like are provided. These are connected to a microcomputer 751 and the like (see FIGS. 6 and 7) via conductors (not shown) formed on the base board 700 and the like. Also, by a radio module 753 (see FIG. 7) and an antenna 754, the controller 7 is caused to function as a wireless controller. Note that a quartz oscillator 703 (not shown) is provided in the housing 71, which generates a basic clock for the microcomputer 751 (described below). Also, the loudspeaker 706 and an amplifier 708 are provided on the upper major surface of the base board 700. Also, the acceleration sensor 701 is provided on a peripheral portion of the base board 700, but not a center portion thereof. Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the rotation of the controller 7 can be determined based on the detected acceleration data with satisfactory sensitivity.

On the other hand, in FIG. 6, the image capture information computing section 74 is provided at a front edge on a lower major surface of the base board 700. The image capture information computing section 74 is comprised of an infrared filter 741, a lens 742, an image capturing element 743, and an image processing circuit 744, which are arranged in this order from the front of the controller 7 and are attached on the lower major surface of the base board 700. A connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus 3. A vibrator 704 is attached onto the lower major surface of the base board 700. The vibrator 704 may be, for example, a vibration motor or a solenoid. The activation of the vibrator 704 generates vibration in the controller 7, so that the vibration is transferred to a player's hand holding the controller 7, thereby making it possible to achieve a so-called vibration-feature supporting game. Since the vibrator 704 is disposed somehow closer to the front of the housing 71, the housing 71 significantly vibrates while the player is holding the controller 7, so that the player easily feels vibration.

Next, an internal configuration of the controller 7 will be described with reference to FIG. 7. Note that FIG. 7 is a block diagram illustrating the configuration of the controller 7.

In FIG. 7, the controller 7 comprises the communication section 75 in addition to the operation section 72, the image capture information computing section 74, the acceleration sensor 701, the loudspeaker 706, the sound IC 707, and the amplifier 708.

The image capture information computing section 74 includes the infrared filter 741, the lens 742, the image capturing element 743, and the image processing circuit 744. The infrared filter 741 passes only infrared light entering from the front of the controller 7. The lens 742 collects infrared light passing through the infrared filter 741 and emits the light toward the image capturing element 743. The image capturing element 743 may be, for example, a solid-state image capturing element, such as a CMOS sensor or a CCD, which captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself. As will be described below, a signal depending on a position or a motion of the controller 7 can be obtained based on the process resultant data output from the image capture information computing section 74.

The controller 7 preferably comprises a three-axis (X, Y and Z axes) acceleration sensor 701. The three-axis acceleration sensor 701 senses linear accelerations in three directions, i.e., a vertical direction, a lateral direction, and a front-to-rear direction. In other embodiments, the acceleration sensor 701 may be a two-axis acceleration detecting means which senses only linear accelerations along the vertical and lateral directions (or another pair of directions). For example, the three- or two-axis acceleration sensors 701 may be of a type which is available from Analog Devices, Inc. or STMicroelectronics N.V. The acceleration sensor 701 may be of a capacitance type (capacitance coupling type) based on a technique of MEMS (Micro Electro Mechanical Systems) obtained by micromachining silicon. However, the three- to two-axis acceleration sensors 701 may be provided using a technique of existing acceleration detecting means (e.g., a piezoelectric type or a piezoelectric resistance type) or other appropriate techniques which will be developed in the future.

As is known to those skilled in the art, an acceleration detecting means used as the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the two or three axes. Therefore, the acceleration sensor 701 cannot directly sense physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated by performing an additional process with respect to an acceleration signal output from the acceleration sensor 701. For example, when a static acceleration (gravitational acceleration) is sensed, an output from the acceleration sensor 701 is used to perform a computation using a tilt angle and the sensed acceleration, thereby making it possible to estimate a tilt of a target (the controller 7) with respect to a gravity vector. Thus, by using the acceleration sensor 701 in combination with the microcomputer 751 (or another processor), the tilt, attitude or position of the controller 7 can be determined. Similarly, for example, when the controller 7 comprising the acceleration sensor 701 is dynamically accelerated and moved by a player's hand, various motions and/or positions of the controller 7 can be calculated or estimated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravitational acceleration) by the acceleration sensor 701, may be for converting a sensed acceleration signal into a tilt angle corresponding thereto. Data indicating the accelerations sensed by the acceleration sensor 701 is output to the communication section 75.

In other embodiments, a gyro-sensor comprising a rotation element, a vibration element, or the like may be employed instead of the acceleration sensor 701. An exemplary MEMS gyro-sensor used in this embodiment is available from Analog Devices, Inc. As is different from the acceleration sensor 701, the gyro-sensor can directly sense a rotation (or an angular velocity) about an axis of at least one gyro-element included therein. Thus, since the gyro-sensor and the acceleration sensor are basically different from each other, one of them is selected, depending on individual applications, and processes performed with respect to output signals from these devices need to be changed as appropriate.

Specifically, when a tilt or an attitude is calculated using a gyro-sensor instead of an acceleration sensor, a significant change is required. Specifically, when a gyro-sensor is used, the value of a tilt is initialized during the start of detection. Thereafter, angular acceleration data output from the gyro-sensor is integrated. Next, the amount of a change in tilt from the initialized tilt value is calculated. In this case, the calculated tilt has a value corresponding to an angle. On the other hand, when an acceleration sensor is used to calculate a tilt, the tilt is calculated by comparing the value of a component about each axis of a gravity acceleration with a predetermined reference. Therefore, the calculated tilt can be represented by a vector, and an absolute direction can be detected by the acceleration detecting means without initialization. Also, whereas a value calculated as a tilt is an angle when a gyro-sensor is used, the value is a vector when an acceleration sensor is used. Therefore, when a gyro-sensor is used instead of an acceleration sensor, the tilt data needs to be subjected to predetermined conversion, taking into consideration a difference between the two devices. The properties of gyro-sensors as well as the basic difference between the acceleration detecting means and the gyro-sensor are know to those skilled in the art, and will not be herein described in more detail. Whereas gyro-sensors have an advantage of directly sensing rotation, acceleration sensors generally have an advantage over the gyro-sensor in terms of cost effectiveness when the acceleration sensor is applied to a controller as used in this embodiment.

The communication section 75 comprises the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus 3 which is received by the radio module 753 via the antenna 754. The sound IC 707 processes sound data or the like transmitted from the game apparatus 3 via the communication section 75.

An operation signal (key data) from the operation section 72 provided in the controller 7, acceleration signals (X-, Y- and Z-axis direction acceleration data; hereinafter simply referred to as acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the communication unit 6, into the memory 752. Here, radio transmission from the communication section 75 to the communication unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth (R) is 5 ms. When timing of transmission to the reception unit 6 arrives, the microcomputer 751 outputs transmission data stored in the memory 752, as a series of pieces of operational information, to the radio module 753. Thereafter, the radio module 753 modulates the operational information using a carrier wave having a predetermined frequency and emits the resultant radio signal from the antenna 754, by means of, for example, the Bluetooth (R) technique. Specifically, the key data from the operation section 72 provided in the controller 7, the acceleration data from the acceleration sensor 701, and the process result data from the image capture information computing section 74 are modulated into a radio signal by the radio module 753, and the radio signal is transmitted from the controller 7. Thereafter, the reception unit 6 of the game apparatus 3 receives the radio signal, and the game apparatus 3 demodulates or decodes the radio signal, thereby obtaining a series of pieces of operational information (the key data, the X-, Y- and Z-axis direction acceleration data, and the process result data). Thereafter, the CPU 30 of the game apparatus 3 performs a game process based on the obtained operational information and a game program. Note that, when the communication section 75 is configured using the Bluetooth (R) technique, the communication section 75 can also have a function of receiving transmission data wirelessly transmitted from other devices.

Next, before describing a specific process executed by the game apparatus 3, an outline of a game which is performed with the game apparatus 3 will be described. In the game, at least two operation modes (a first operation mode and a second operation mode) are set, between which viewpoints for game images displayed on the monitor 2 are switched.

Figure 9:
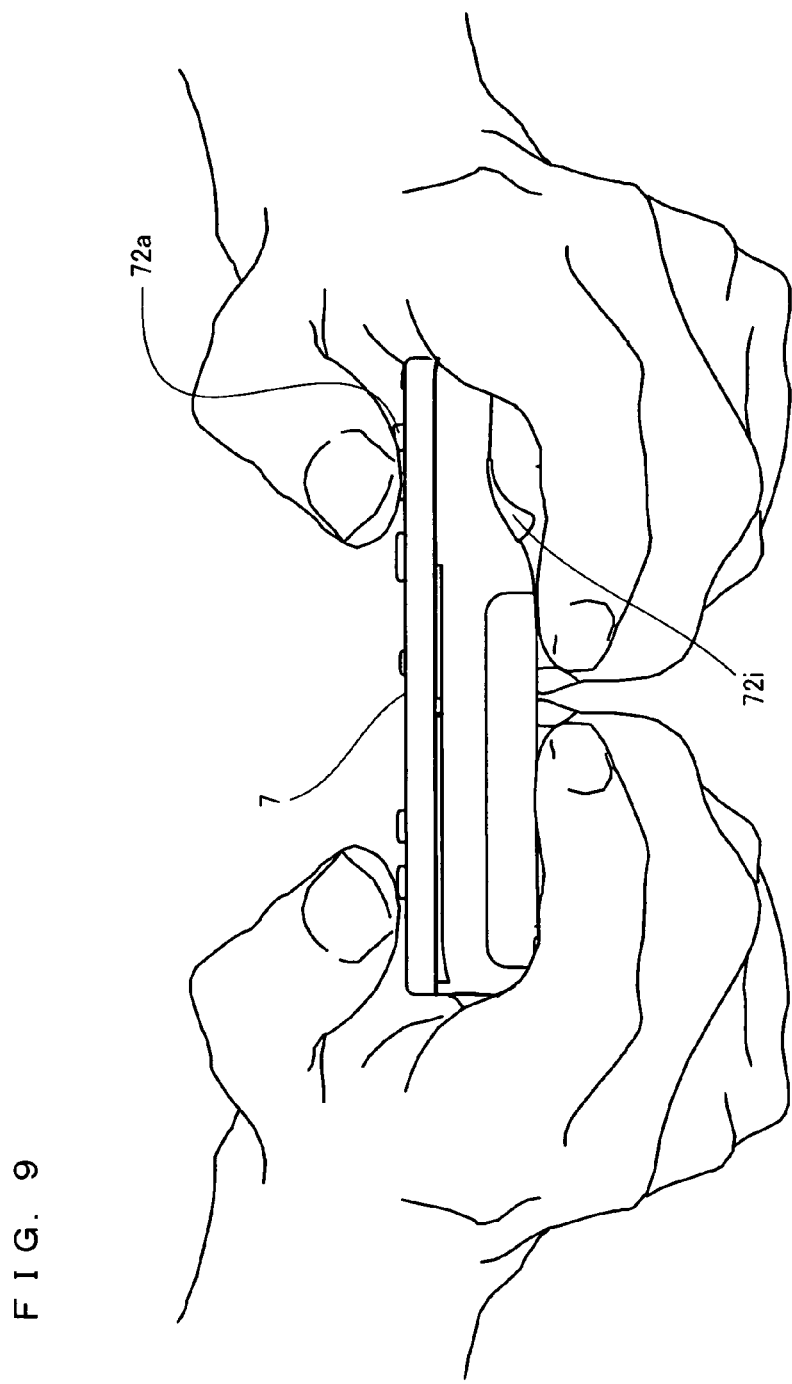
FIG. 9 is a diagram illustrating an example in which the player laterally holds the controller 7 with both hands in the first operation mode, as viewed sideways.

FIG. 8 illustrates an example in which the player operates the controller 7 in the first operation mode set in the game. FIG. 9 illustrates an example in which the player laterally holds the controller 7 in the first operation mode, as viewed sideways. As illustrated in FIGS. 8 and 9, in the first operation mode, for example, the controller 7 is held and operated by both hands of the player with the longitudinal direction of the controller is laterally oriented. Specifically, the player holds the front side of the controller 7 with the left hand and the rear side of the controller 7 with the right hand, and performs a game operation by pressing down the operation section 72 (e.g., the cross key 72a and the operation buttons 72b to 72g) with fingers of the left and right hands. In this case, the controller 7 is held in a manner which causes a side surface of the controller 7 (a right side surface in the example of FIGS. 8 and 9) to face the display screen of the monitor 2. For example, the player seizes the controller 7 from the front and rear surfaces with the palm of each hand, the controller 7 being supported from the lower surface by the index fingers, the middle fingers, the ring fingers, and the little fingers. The thumbs of both hands are placed at the operation section 72 (e.g., in the vicinity of the cross key 72a or the operation buttons 72b to 72d) provided on the upper surface of the controller 7. In this case, since the controller 7 is longer than it is wide and the cross key 72a is disposed at one end portion in the longitudinal direction, when the player laterally holds the controller 7, the cross key 72a can be easily operated with the thumb or the like of one hand. Also, since the operation button 72b and the operation button 72c are disposed at the other end portion in the longitudinal direction, these buttons can be easily operated by the thumb or the like of the other hand when the controller 7 is laterally held. On the other hand, the operation button 72i is located in a player's blind spot when the controller 7 is laterally held as illustrated in FIG. 9. Therefore, it is difficult to operate the operation button 72i since it is provided on the rear slope surface of the hollow portion of the controller 7, so that the player's fingers spontaneously leave away from the operation button 72i. Thus, in the first operation mode, when the player laterally holds the controller 7, the operation section 72, such as the cross key 72a, the operation buttons 72b to 72d and the like, can be easily operated.

Figure 10:
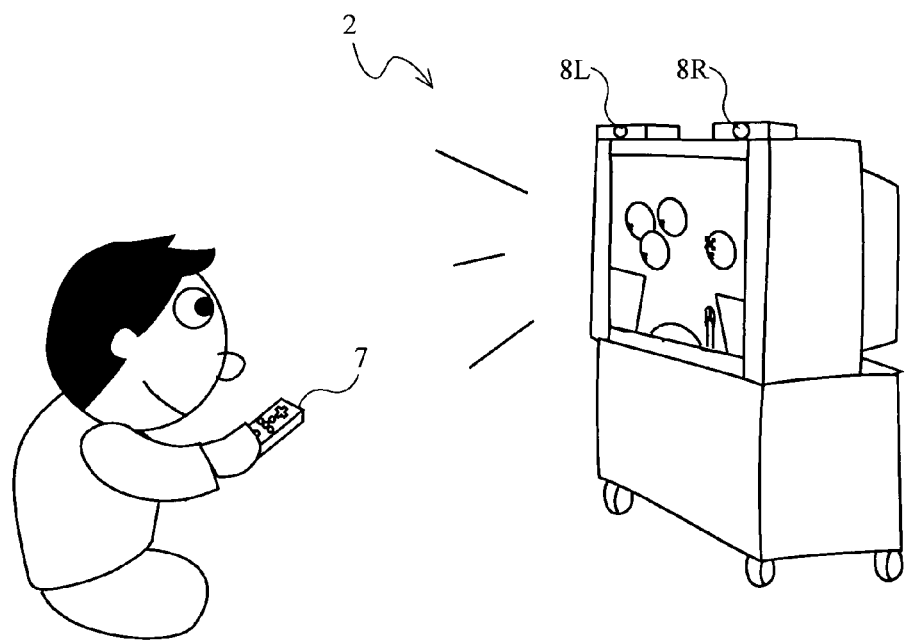
FIG. 10 is a diagram for generally describing a state in which the player performs a game operation using the controller 7 of FIG. 3 in a second operation mode.
Figure 11:
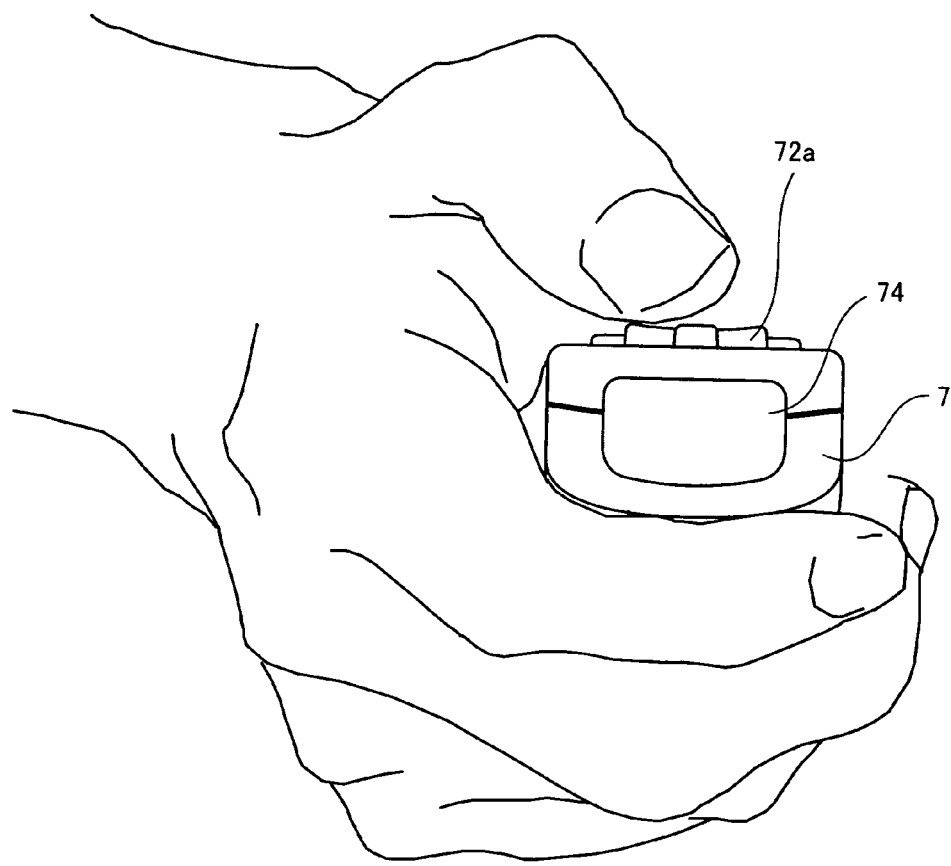
FIG. 11 is a diagram illustrating an example in which the player holds the controller 7 with the right hand in the second operation mode, as viewed from the front of the controller 7.
Figure 12:
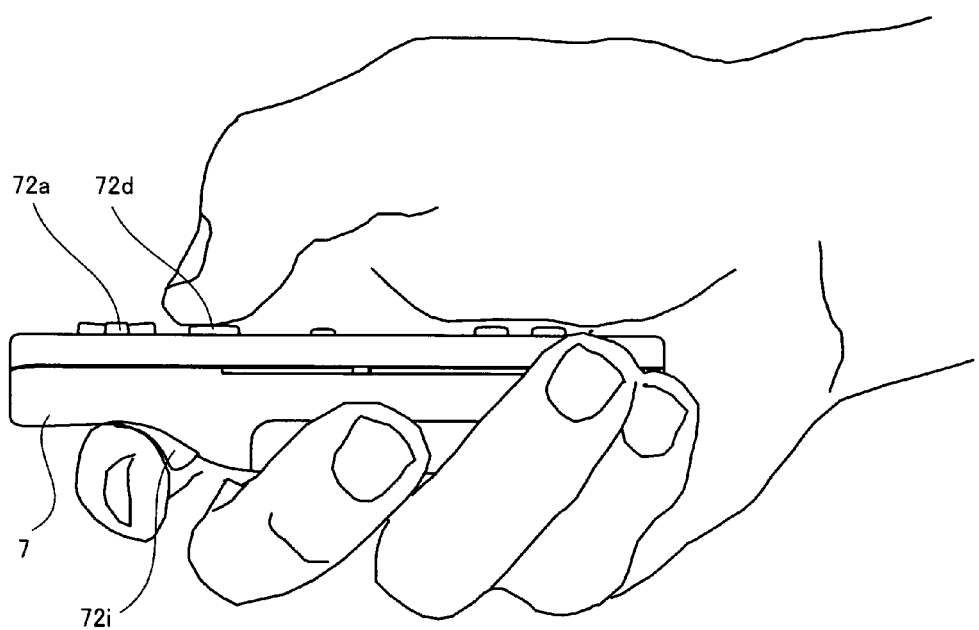
FIG. 12 is a diagram illustrating an example in which the player holds the controller 7 with the right hand in the second operation mode, as viewed from the left side of the controller 7.

FIG. 10 illustrates an example in which the player operates the controller 7 in the second operation mode set for the game. FIG. 11 illustrates an example in which the player holds the controller 7 with the right hand in the second operation mode, as viewed from the front of the controller 7. FIG. 12 illustrates the example in which the player holds the controller 7 with the right hand in the second operation mode, as viewed from the left side of the controller 7. As illustrated in FIGS. 10 to 12, in order to play the game in the second operation mode, the player holds the controller 7 with one hand (e.g., the right hand) with the front surface of the controller 7, on which an entrance of the image capture information computing section 74 from which light enters and is captured is provided, facing the display screen of the monitor 2. When the player' thumb is placed on the upper surface of the controller 7 (e.g., in the vicinity of the operation button 72d), and the player's index finger is placed at the hollow portion of the lower surface of the controller 7 (e.g., in the vicinity of the operation button 72i), the light entrance of the image capture information computing section 74 provided on the front surface of the controller 7 is exposed in the forward direction of the player. On the other hand, the two markers 8L and 8R are provided in the vicinity of the display screen of the monitor 2. The markers 8L and 8R each emit infrared light in the forward direction of the monitor 2, and are targets whose images are to be captured by the image capture information computing section 74. The markers 8L and 8R may be integrated with the monitor 2 or may be separated from the monitor 2 and may be provided near the monitor 2 (e.g., above or below the monitor 2) in use. Note that the controller 7 can be held with the player's left hand in a similar manner.

Thus, in the second operation mode, the operation section 72, such as the operation buttons 72d and 72i and the like, can be easily operated while the controller 7 is held with one hand of the player. Further, when the player holds the controller 7 with one hand, the light entrance of the image capture information computing section 74 provided on the front surface of the controller 7 is exposed, so that infrared light from the two markers 8L and 8R can be easily received through the light entrance. In other words, the player can hold the controller 7 with one hand without blocking the function of the image capture information computing section 74. Here, since the controller 7 is longer than it is wide, and the light entrance of the image capture information computing section 74 is provided on the front surface (end portion) of the longitudinal direction, the image capture information computing section 74 is suitable for a pointing operation which is performed by the player using the controller 7. On the other hand, since the operation button 72i is provided on the rear slope surface of the hollow portion of the controller 7 as illustrated in FIG. 12, when the player longitudinally holds the controller 7, the operation button 72i can be easily operated by a player's finger. Thus, in the second operation mode, the player can easily operate the image capture information computing section 74 and the operation section 72 while longitudinally holding the controller 7.

Here, as illustrated in FIG. 13, the markers 8L and 8R each have a view angle θ1. The image capturing element 743 has a view angle θ2. For example, the view angle θ1 of the markers 8L and 8R is 34° (half angle), and the view angle θ2 of the image capturing element 743 is 41°. When both the markers 8L and 8R are present within the view angle θ2 of the image capturing element 743 and the image capturing element 743 is present within the view angle θ1 of the marker 8L and within the view angle θ1 of the marker 8R, the game apparatus 3 calculates a position of the controller 7 using positional data about high luminance points of the two markers 8L and 8R.

When the player holds the controller 7 in a manner which causes the front surface thereof to face the monitor 2, infrared light emitted from the two markers 8L and 8R enters the image capture information computing section 74. The incoming infrared light beams are captured by the image capturing element 743 via the infrared filter 741 and the lens 742, and the captured images are processed by the image processing circuit 744. Here, the image capture information computing section 74 detects infrared components output from the markers 8L and 8R to obtain information about positions in the captured image of the markers 8L and 8R (positions of target images) and size information about areas, diameters, widths and the like thereof. Specifically, in the image processing circuit 744, the image capturing element 743 analyzes the captured image data, and thereby, initially excludes, from the area information, images which cannot be of the infrared light from the markers 8L and 8R, and further determines high luminance points as positions of the markers 8L and 8R. Thereafter, the image capture information computing section 74 obtains positional information, such as a center-of-gravity position or the like, of the determined luminance points, and outputs it as the process result data. Here, the positional information as the process result data may be output as coordinate values where a predetermined reference point in the captured image (e.g., a center or an upper left corner of the captured image) is used as the origin, or as a vector indicating a difference in position between a current luminance point and a reference point where the reference point is a luminance point with predetermined timing. Specifically, the positional information of the target image is a parameter which is a difference from a predetermined reference point which is set with respect to an image captured by the image capturing element 743. When such positional information is transmitted to the game apparatus 3, the game apparatus 3 can obtain the amount of a change in a signal depending on the motion, attitude, position or the like of the image capture information computing section 74, i.e., the controller 7, with respect to the markers 8L and 8R, based on the difference between the positional information and the reference. Specifically, when the controller 7 is moved, the high luminance points of images transmitted from the communication section 75 are changed. Therefore, by inputting a direction or a coordinate point corresponding to a change in position of the high luminance point, it is possible to input a direction or a coordinate point along a movement direction of the controller 7 in a three-dimensional space. Note that, in an exemplary game process operation described below, the image capture information computing section 74 obtains and outputs, as the process result data, at least the coordinates of the center-of-gravity positions of the target images of the markers 8L and 8R in a captured image.

Thus, an image of a marker fixedly provided (in the example, infrared light from the two markers 8L and 8R) is captured by the image capture information computing section 74 of the controller 7. By processing data output from the controller 7, an operation can be performed, depending on the motion, attitude, position or the like of the controller 7, resulting in a more intuitive operation than an operation of pressing down a button, such as an operation button or key, in a game process of the game apparatus 3. Also, since the markers 8L and 8R are provided in the vicinity of the display screen of the monitor 2 as described above, it is possible to readily convert a position with respect to the markers 8L and 8R into a motion, an attitude, a position or the like of the controller 7 with respect to the display screen of the monitor 2. In other words, process result data, such as the motion, attitude, position or the like of the controller 7, can be used as an operation input which directly acts on the display screen of the monitor 2. Therefore, in the second operation mode, by the player moving a hand with which the controller 7 is held with respect to the display screen of the monitor 2, the motion of the player's hand directly acts on the display screen as an operation input. Therefore, the controller 7 can function as a pointing device which can output data for remotely designating a coordinate point with respect to the display screen.

Also, in any of the first and second operation modes, the tilt, attitude, or position of the controller 7 can be determined using an output (acceleration data) of the acceleration sensor 701 provided in the controller 7 as described above. Specifically, by the player moving a hand with which the controller 7 is held, vertically, laterally or the like, the controller 7 functions as an operation input means depending on a motion or an orientation of the player's hand.

Also, in the game of the example, game images (an objective image and a subjective image) to be displayed on the monitor 2 are changed, depending on the first operation mode or the second operation mode. Note that the objective image refers to an image of a player character and its surrounding virtual game space as viewed objectively, and the subjective image refers to an image of a player character and its surrounding virtual game space as viewed subjectively.

Figure 15:
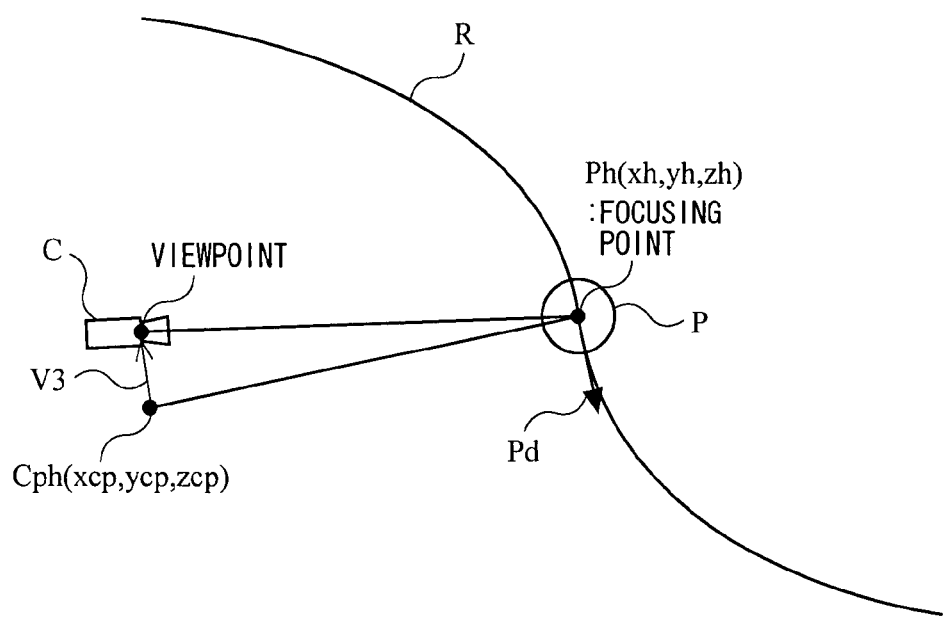
FIG. 15 is a schematic overhead view of a position of a virtual camera C above a player character P in an objective image.

FIG. 14 illustrates an exemplary objective image which is displayed on the monitor 2 in the first operation mode. FIG. 15 is a schematic overhead view of a player character P as viewed by a virtual camera C above the player character P when an objective image is generated. As illustrated in FIG. 14, in the first operation mode, an action game or the like is expressed on the monitor 2, depending on operation information (key data and acceleration data) received from the controller 7 excluding the process result data. Specifically, in the first operation mode, a virtual game space when the player character P (or its vicinity) is focused from a viewpoint located at a relatively far distance in a lateral direction of the player character P (a lateral direction with respect to an orientation of the player character as a reference, or a lateral direction with respect to a traveling direction of the player character as a reference), is expressed as a three-dimensional game image on the monitor 2 (this game image is referred to as an objective image). The player character P which is operated by the player, an enemy character E, and the like are disposed in the virtual game space S and are expressed on the monitor 2. As illustrated in FIG. 14, in the objective image set in the first operation mode, a game image with a wide visual field is generated which objectively expresses the whole body of the player character P and a game world including the player character P.

Exemplary parameter settings for the virtual camera C when an objective image is generated will be described with reference to FIG. 15. In the space S, a route R is previously set and the player character P is set to be able to move on the route R. Specifically, the player character P is moved in a leftward direction on the route R when the left portion of the cross key 72a is pressed down and in a rightward direction on the route R when the right portion of the cross key 72a is pressed down. A focusing point of the virtual camera C is set at a current position Ph of the player character P in the space S (e.g., position coordinates (xh, yh, zh) of a head portion of the player character P). Note that the focusing point of the virtual camera C may be set at a point at a predetermined distance away from the current position Ph (e.g., in a forward direction or a traveling direction of the player character P, in an attacking direction of the player character P (e.g., a direction in which a gun is aimed), etc.), a point at a predetermined distance along the route R, or the like. Note that, also in this case, the predetermined distance is preferably sufficiently small for the range of the game space whose image is captured by the virtual camera C, and also, a distance between the focusing point and the player character P is preferably smaller than a distance between the viewpoint and the player character P.

On the other hand, the viewpoint of the virtual camera C is set at a position shifted from a reference point Cph (xcp, ycp, zcp) in the virtual game space which is determined, corresponding to each position Ph (xh, yh, zh) of the player character P (i.e., each point on the route R), wherein the shift amount depends on a direction Pd of the player character P (e.g., the forward direction or the traveling direction of the player character P, the attacking direction of the player character P, etc.). Specifically, a direction from the viewpoint toward the focusing point and a distance between the viewpoint and the focusing point are previously set, corresponding to each point on the route R, and a point which is located away from the position Ph (xh, yh, zh) in the above-described direction and at the above-described distance corresponding to the position Ph is set as the point Cph (xcp, ycp, zcp). For example, a direction from the point Cph toward the focusing point is set to be a horizontal direction perpendicular to the route R. A distance between the point Cph and the focusing point is set to be several times (e.g., about eight times) a predetermined distance (e.g., the shoulder length of the player character P or the like). The viewpoint of the virtual camera C is set at a position shifted by several times (e.g., about five times) the predetermined distance from the point Cph in a direction opposite (backward) to the direction Pd of the player character P (e.g., the attacking direction of the player character P (the aiming direction of a gun G held by the player character P), the forward direction or the traveling direction of the player character P, etc.).

Note that the viewpoint of the virtual camera C may be set at the point Cph. Also, in the example, since the above-described direction and distance are set, corresponding to each position of the player character P (each point on the route R), the direction and distance can be arbitrarily changed, depending on the state of the game space or the situation of the game. Note that the direction and distance may be fixed. In this case, for example, a direction (e.g., substantially a perpendicular direction, etc.) which is determined using, as a reference, the trajectory direction of the route R or the forward direction or the traveling direction of the player character P, may be set as a line-of-sight direction, or the distance between the viewpoint and the focusing point may be fixed.

Note that the position and direction of the virtual camera C in the objective image are basic settings in the first operation mode, and the virtual camera C may be shifted from the basic position, depending on the operation of the controller 7 in the first operation mode. Note that, in the first operation mode, even if the virtual camera C is shifted from the basic position, since an image is generated by objectively widely viewing the space S from a relatively distant point where the position of the player character P or its vicinity is a focusing point. Such an image is herein defined as an objective image.

Although it has been described above that an image of a virtual space is captured where a relatively distant point in a lateral direction of the player character P is set as a viewpoint and the current position of the player character P is a focusing point, an image of a virtual game space may be captured where a relatively distant point in a backward direction of the player character P is a viewpoint and the current position of the player character P is a focusing point. Although the positions on a horizontal plane of the viewpoint and the focusing point have been mainly described above, positions in a height direction of the viewpoint and the focusing point may be the same as or higher (or lower in some cases) than the current position of the player character P.

Figure 16:
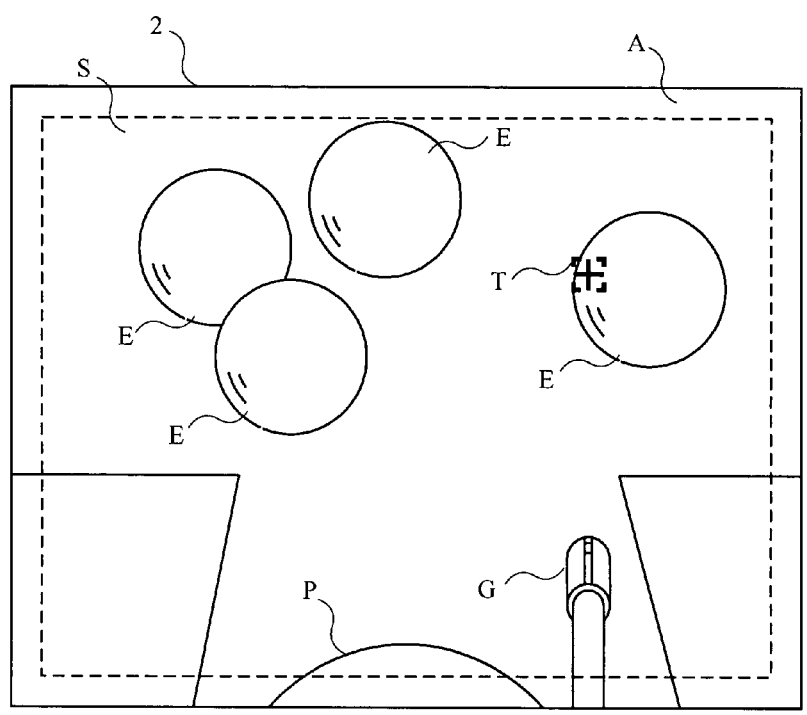
FIG. 16 is a diagram illustrating an exemplary subjective game image which is displayed on the monitor 2 in the second operation mode.

FIG. 16 illustrates an exemplary subjective image which is displayed on the monitor 2 in the second operation mode. FIG. 17 is a schematic diagram illustrating a position of the virtual camera C when a subjective image is generated, as viewed from a lateral direction of the player character P. As illustrated in FIG. 16, in the second operation mode, an action game or the like is expressed on the monitor 2, depending on operation information (key data, acceleration data, or process result data) received from the controller 7. Specifically, in the second operation mode, a virtual game space (space S) as viewed from a viewpoint in the virtual game space substantially coinciding with the position of the player character P is expressed on the monitor 2 as a three-dimensional game image (the game image is referred to as a subjective image). As illustrated in FIG. 16, in the subjective image set in the second operation mode, a game image is generated in which a portion of the player character P is expressed, thereby expressing a visual field of the player character P which is subjectively viewing the space S.

An exemplary position of the virtual camera C in a subjective image will be described with reference to FIG. 17. The focusing point of the virtual camera C is set at the front of the player character P where the position Ph of the player character P in the space S is a reference. Specifically, a position in a horizontal direction of the focusing point of the virtual camera C is set to be a position (T1 in FIG. 17) which is at several times (e.g., about four times) a predetermined distance in an attacking direction of the player character P (the aiming direction of the gun G held by the player character P) away from a position which is at the predetermined distance (e.g., the shoulder length of the player character P) in the front direction (the forward direction or the traveling direction of the player character P) away from the position coordinate point Ph (xh, yh, zh) of the head portion of the player character P. A position in a vertical direction of the focusing point of the virtual camera C is set to be a position (T2 in FIG. 17) which is at a fraction (e.g., about ¼) of the predetermined distance in a downward direction away from the position coordinate point Ph (xh, yh, zh).

On the other hand, the viewpoint of the virtual camera C is set at the rear of and in the vicinity of the player character P where the position Ph of the player character P in the space S is a reference. Specifically, a position in a horizontal direction of the viewpoint of the virtual camera C is set to be a position (V1 in FIG. 17; substantially, a position at about the predetermined distance in a backward direction away from the position coordinate point Ph) which is at several times (e.g., about two times) the predetermined distance in a direction opposite to the attacking direction of the player character P (the aiming direction of the gun G held by the player character P) away from a position which is at the predetermined distance in the front direction away from the position coordinate point Ph (xh, yh, zh) A position in a vertical direction of the viewpoint of the virtual camera C is set to be a position (V2 in FIG. 17) which is at a distance (about ¼ of the predetermined distance) corresponding to about a size of the head portion of the player character P in the upward direction away from the position coordinate point Ph (xh, yh, zh) Note that the horizontal direction position of the viewpoint of the virtual camera C may be set to be a position which is at half of the predetermined distance in a rightward direction or a leftward direction of the player character P (the right or leftward direction perpendicular to the forward direction or traveling direction of the player character P) away from the position V2. Also, when the first operation mode is switched to the second operation mode while the player character P is traveling in a rightward direction on the route R, the viewpoint of the virtual camera C may be shifted in the right perpendicular direction of the player character P. When the first operation mode is switched to the second operation mode while the player character P is traveling in a leftward direction on the route R, the viewpoint of the virtual camera C may be shifted in the left perpendicular direction of the player character P.

Note that, in FIG. 17, a line laterally extending from the position Ph of the head portion of the player character P indicates the line-of-sight direction of the player character P (which is different from the line-of-sight direction of the virtual camera C). Although it has been assumed above that the line-of-sight direction of the player character P is a horizontal direction, the line-of-sight direction of the player character P is actually a direction which is vertically tilted, depending on the situation. When the line-of-sight direction of the player character P is vertically tilted, the laterally extending line of FIG. 17 is also tilted, so that the focusing point of the virtual camera C is shifted downward by T2 from a point on the laterally extending line (a point at a distance of T1 away from Ph), and the viewpoint of the virtual camera C is shifted upward by V2 from a point on the laterally extending line (a point at a distance of V1 away from Ph).

The above-described position and direction of the virtual camera C in the subjective image are basic settings in the second operation mode. The virtual camera C may be moved from the basic position, depending on the operation of the controller 7 in the second operation mode. Note that, in the second operation mode, even when the virtual camera C is moved from the basic position, the viewpoint of the virtual camera C is set to be in the vicinity of or coincide with the position of the player character P. Such a game image is herein defined as a subjective image.

As can be clearly understood by comparing FIGS. 14 and 16, the objective game image provides a wide view of the space S around the player character P, and therefore, is an image suitable for a case where the player character P is moved in the space S. On the other hand, the subjective game image provides a view of the space S as if it were seen by the player character P, and therefore, is an image suitable for a situation in which the enemy character E is shot by the gun G. Further, the player moves the hand holding the controller 7 with respect to the display screen of the monitor 2 to directly designate a position of an aiming cursor T (shooting position), and presses down the operation button 72d or the operation button 72i (see FIG. 3) to control firing of the gun G possessed by the player character P toward the aiming cursor T, thereby providing the sense of operation as if the player itself shot the enemy character E.

Figure 18:
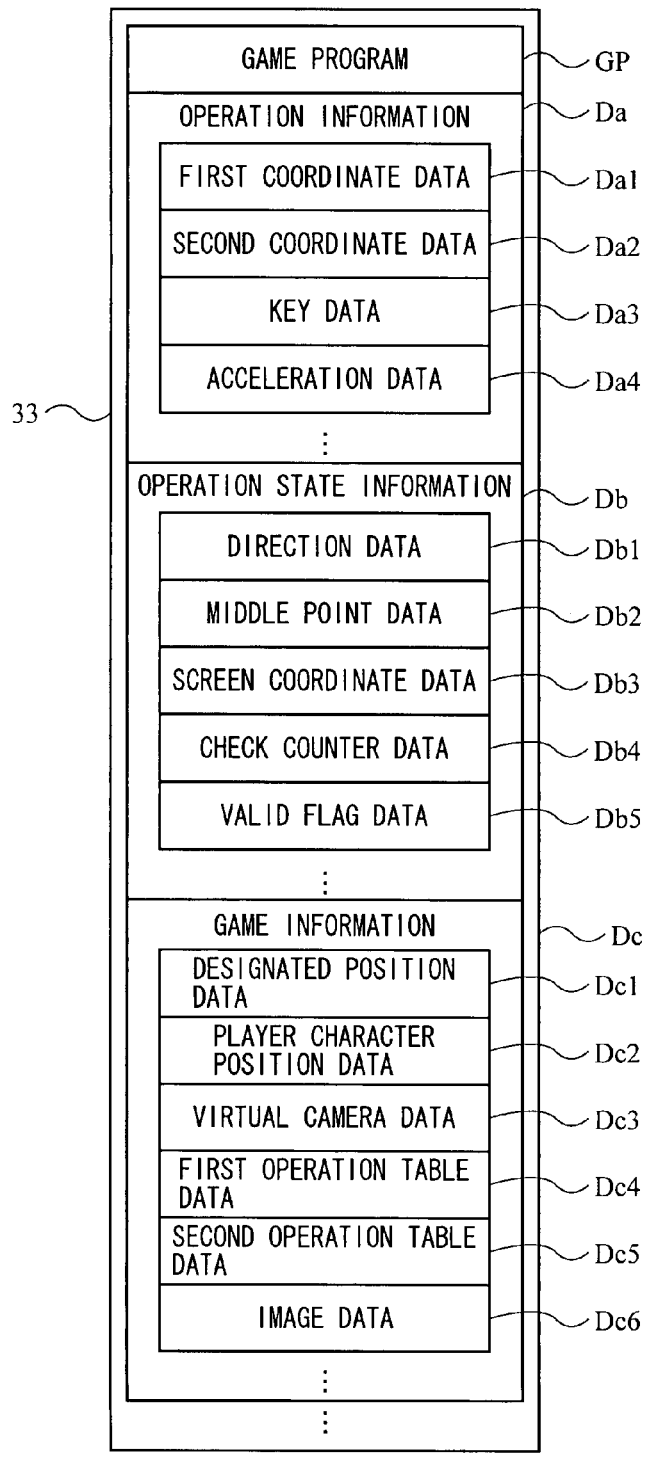
FIG. 18 is a diagram illustrating exemplary main data stored in a main memory 33 of the game apparatus 3.

Next, a game process performed in the game system 1 will be described in detail. Firstly, main data used in the game process will be described with reference to FIGS. 18 to 20. Note that FIG. 18 is a diagram illustrating an exemplary main program and data stored in the main memory 33 of the game apparatus 3. FIG. 19 is a diagram illustrating exemplary first operation table data Dc4 stored in the main memory 33. FIG. 20 is a diagram illustrating exemplary second operation table data Dc5 stored in the main memory 33.

As illustrated in FIG. 18, the main memory 33 stores a game program GP, operation information Da, operation state information Db, game information Dc, and the like. Note that the main memory 33 stores, in addition to the data included in the information of FIG. 18, data required for the game process, such as other data about a player character appearing in a game, data about an enemy character, data about a game space (geographic data, etc.), and the like.

The game program GP is a program which includes programs required for processes which are read from the optical disc 4 by the CPU 30 and are stored as appropriate and defines a game process (steps 50 to 94 described below). The game process is started by the start of execution of the game program GP.

The operation information Da is a series of pieces of operation information transmitted as transmission data from the controller 7, and is updated with latest operation information. The operation information Da includes first coordinate data Da1 and second coordinate data Da2 corresponding to the above-described process result data. The first coordinate data Da1 is coordinate data indicating a position of one of the images of the two markers 8L and 8R with respect to an image captured by the image capturing element 743 (a position in the captured image). The second coordinate data Da2 is coordinate data indicating a position of the image of the other marker (a position in the captured image). For example, the position of the image of the marker is represented by an XY coordinate system in the captured image.

The operation information Da includes, in addition to coordinate data which is exemplary process result data obtained in a captured image (the first coordinate data Da1 and the second coordinate data Da2), key data Da3 obtained from the operation section 72, acceleration data Da4 obtained from the acceleration sensor 701, and the like. Note that the reception unit 6 of the game apparatus 3 receives the operation information Da which is transmitted from the controller 7 in predetermined intervals of, for example, 5 ms, which is in turn accumulated into a buffer (not shown) provided in the reception unit 6. Thereafter, the operation information Da is read out per frame (1/60 sec) which is a game process interval, and the latest information is stored in the main memory 33.

The operation state information Db is information which is obtained by determining an operation state of the controller 7 based on a captured image. The operation state information Db is data which is obtained based on a position or an orientation of a target image (marker) included in the captured image. Specifically, the operation state information Db includes direction data Db1, middle point data Db2, screen coordinate data Db3, check counter data Db4, valid flag data Db5, and the like. The direction data Db1 is data indicating a direction from the first coordinate data Da1 to the second coordinate data Da2. For example, the direction data Db1 is data of a vector whose start point is the position of the first coordinate data Da1 and whose end point is the position of the second coordinate data Da2. The middle point data Db2 indicates the coordinates of a middle point between the first coordinate data Da1 and the second coordinate data Da2. Here, when the images of the two markers (the markers 8L and 8R) are considered as a single target image, the middle point data Db2 indicates a position of the target image. The screen coordinate data Db3 is positional data of a screen coordinate system which indicates a position pointed out by the controller 7 with respect to the display screen of the monitor 2, and is calculated using the direction data Db1 and the middle point data Db2. The check counter data Db4 is data indicating a check counter value CC. The check counter value CC indicates the number of times (represented by a positive integer) when positions pointed out by the controller 7 are successively present within a predetermined range, and the number of times (represented by a negative number) when positions pointed out by the controller 7 are successively present out of the predetermined range. The valid flag data Db5 is data indicating a state of a valid flag f. The valid flag f is set to be valid (true) when the process result data from the controller 7 can be used in the game process, and invalid (false) when the process result data from the controller 7 cannot be used in the game process.

The game information Dc includes designated position data Dc1, player character position data Dc2, virtual camera data Dc3, the first operation table data Dc4, the second operation table data Dc5, image data Dc6, and the like. The designated position data Dc1 is coordinate data indicating a position in a virtual game space corresponding to (coinciding with) screen coordinates in a virtual three-dimensional game image displayed on the display screen based on the screen coordinate data Db3. The player character position data Dc2 is coordinate data indicating a position in the virtual game space at which the player character P is located. The virtual camera data Dc3 is data indicating a viewpoint position in the virtual game space at which the virtual camera C is located and a line-of-sight direction thereof. The first operation table data Dc4 and the second operation table data Dc5 are data indicating contents of game control processes corresponding to operation means in the first operation mode and the second operation mode, respectively. The image data Dc6 is data for generating a game image in which a player character and other characters are provided in the virtual game space, including player character image data, other-character image data, background image data, and the like.

An example of the first operation table data Dc4 will be described with reference to FIG. 19. The first operation table data Dc4 is data indicating a first operation table which indicates contents of game control processes corresponding to player's operations in the first operation mode. For example, it is described in the first operation table that the player character P is laterally moved in the virtual game space in response to the player pressing down the upward and downward-direction projecting pieces (projecting pieces directed leftward and rightward as viewed from the player when the controller 7 is laterally held) of the cross key (the operation button 72a). It is also described that the player character P crouches down in the virtual game space in response to the player pressing down the leftward-direction projecting piece (a projecting piece directed downward as viewed from the player when the controller 7 is laterally held) of the cross key. It is also described that the player character P shoots a first beam in response to the player pressing down a first button (the operation button 72b). It is also described that the player character P charges and then shoots the first beam in response to the player continuing to press down the first button for a predetermined time (long press) and then stopping pressing down (releasing) the first button. It is also described that the player character P shoots a second beam different from the first beam in response to the player pressing down the first button while pressing down the rightward-direction projecting piece (a projecting piece directed upward as viewed from the player when the controller 7 is laterally held) of the cross key. It is also described that the player character P jumps in the virtual game space in the response to the player pressing down a second button (the operation button 72c). It is also described that the distance between the virtual camera C and the player character P is increased in response to the player pressing down the A-button (the operation button 72d). It is also described that the aiming direction of the gun G held by the player character P (the attacking direction of the player character P (the shooting direction of a projectile)) is changed, i.e., the shooting direction parameter of the projectile is determined, depending on the tilt of the controller 7 which is calculated using the acceleration data Da4. Specifically, for example, when the left end of the controller 7 is lifted while being laterally held, the shooting direction of the projectile is set to be a leftward and upward direction with respect to the position of the player character P.

Note that, in this example, as described below, since the player character P is moved on the route R, the movement of the player character P is controlled using only the leftward and rightward direction projecting pieces of the cross key. Alternatively, when the player character P can be freely moved without being limited to the route R, the player character P may be moved in other directions using the upward and downward direction projecting pieces of the cross key.

An example of the second operation table data Dc5 will be described with reference to FIG. 20. The second operation table data Dc5 is data indicating a second operation table which describes contents of game control processes corresponding to player's operations in the second operation mode. For example, it is described in the second operation table that the aiming cursor T is moved to a position having screen coordinates pointed out by the player using the controller 7 (note that the aiming cursor T indicates a shooting position, and the shooting direction parameter of a projectile is determined by moving the aiming cursor T; more specifically, a direction connecting between a position in the virtual game space corresponding to the aiming cursor T and the position of the player character P is set as the shooting direction parameter). It is also described that the direction of the virtual camera C is changed in response to the player pointing out a peripheral region of a game image using the controller 7 while pressing down the B-button (the operation button 72i). It is also described that the player character P shoots the first beam in response to the player pressing down the A-button. It is also described that the player character P charges and then shoots the first beam in response to the player pressing down the A-button for a long time (long press) and then releasing the A-button. It is also described that the player character P shoots a first missile in response to the player pressing down the A-button and the B-button and then releasing only the A-button. It is also described that the player character P shoots a second missile different from the first missile in response to the player pressing down the A-button and the B-button and then pressing down the A-button for a long time (long press) and then releasing the A-button.

It is also described that, when a motion of the controller 7 calculated using the acceleration data Da4 is a swing-up motion, the player character P jumps in the virtual game space. It is also described that, when a motion of the controller 7 calculated using the acceleration data Da4 is a pull motion toward the player, the player character P turns around in the virtual game space. It is also described that, while the player is pressing down the B-button, the viewpoint of the virtual camera C is moved to the head portion of the player character P (i.e., the position Ph). It is also described that, when the player swings the controller 7 upward and then downward while pressing the A-button in a situation where the virtual game space (pseudo-three-dimensional image) is pointed out by the aiming cursor T using the controller 7, the player character P shoots a second beam (or a weapon, such as a chain with a cannonball at an end thereof, or the like) toward a position in virtual game space pointed out by the aiming cursor T. In this case, by pressing down the A-button, the result of determination in step 84 is YES, and thereafter, even when position coordinates in the screen coordinate system pointed out by the controller 7 are moved out of the predetermined range by swinging up the control 7, neither switching to an objective image nor switching to the first operation mode is performed.

Note that, in this example, a projectile is controlled to be shot toward a position in the virtual game space corresponding to the position of the aiming cursor T. In a variation, the player character P may be controlled to move toward the position in the virtual game space corresponding to the position of the aiming cursor T.

As can be clearly understood by comparing the first operation table and the second operation table, the contents of game control processes corresponding to operation means are different. For example, when the player presses down the A-button, the position of the virtual camera C is changed in the first operation table, while the player character P shoots the first beam in the second operation table. Also, in the first operation table, neither process result data from the image capture information computing section 74 nor a process using the B-button is described. This is because, in the first operation mode, the player laterally holds the controller 7, and therefore, it is difficult for the player to press down the B-button, and also, the image capture information computing section 74 cannot capture images of the markers 8L and 8R, and therefore, it is difficult for the player to use these operation means. Thus, in the first operation table and the second operation table, the contents of game controls suitable for player's operations are described, corresponding to the operation modes which are switched, depending on a direction in which the player holds the controller 7 or a direction which is pointed out by the controller 7.

Figure 21:
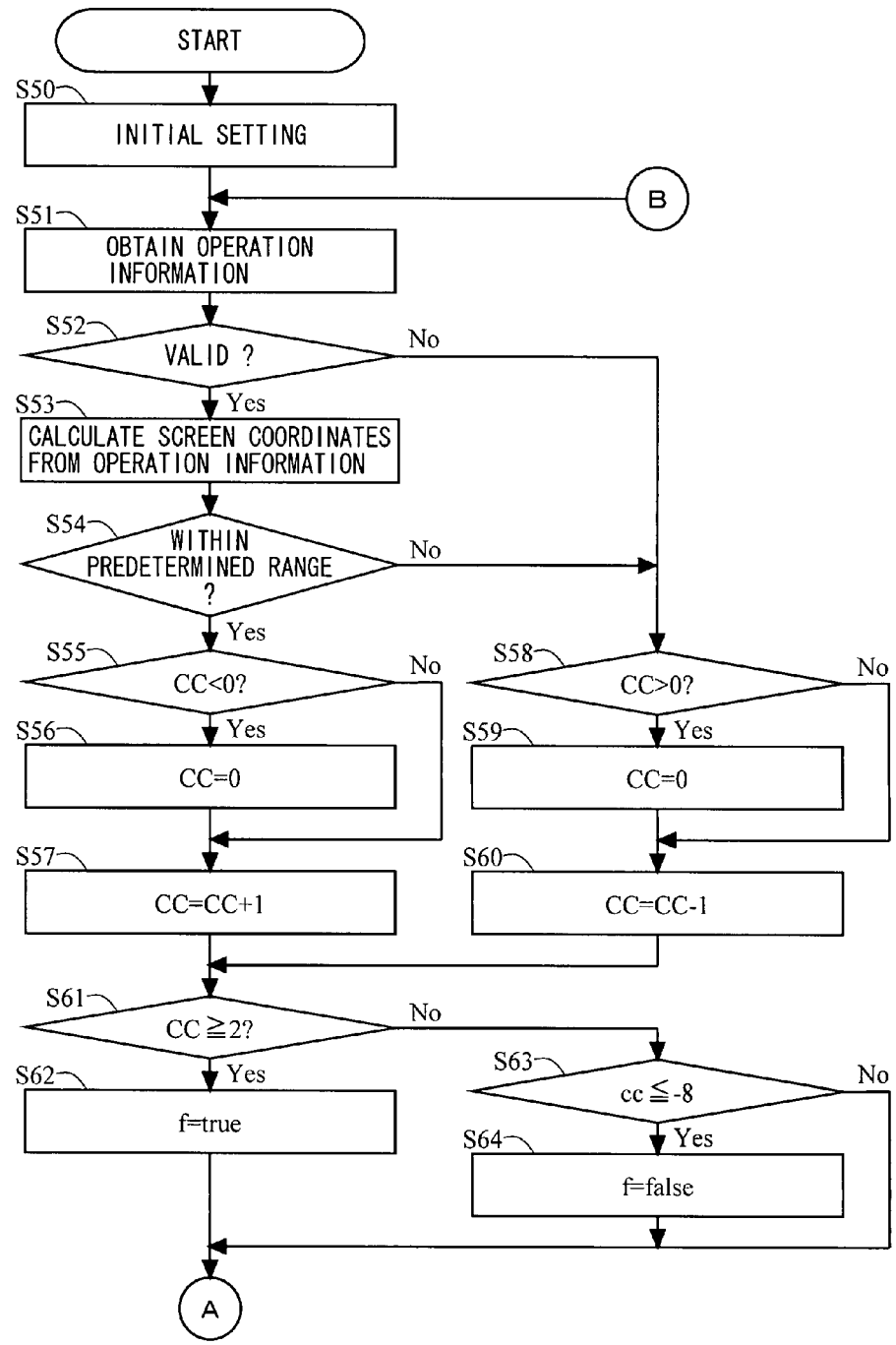
FIG. 21 is a flowchart illustrating a flow of a first half of a game process executed in the game apparatus 3.
Figure 22:
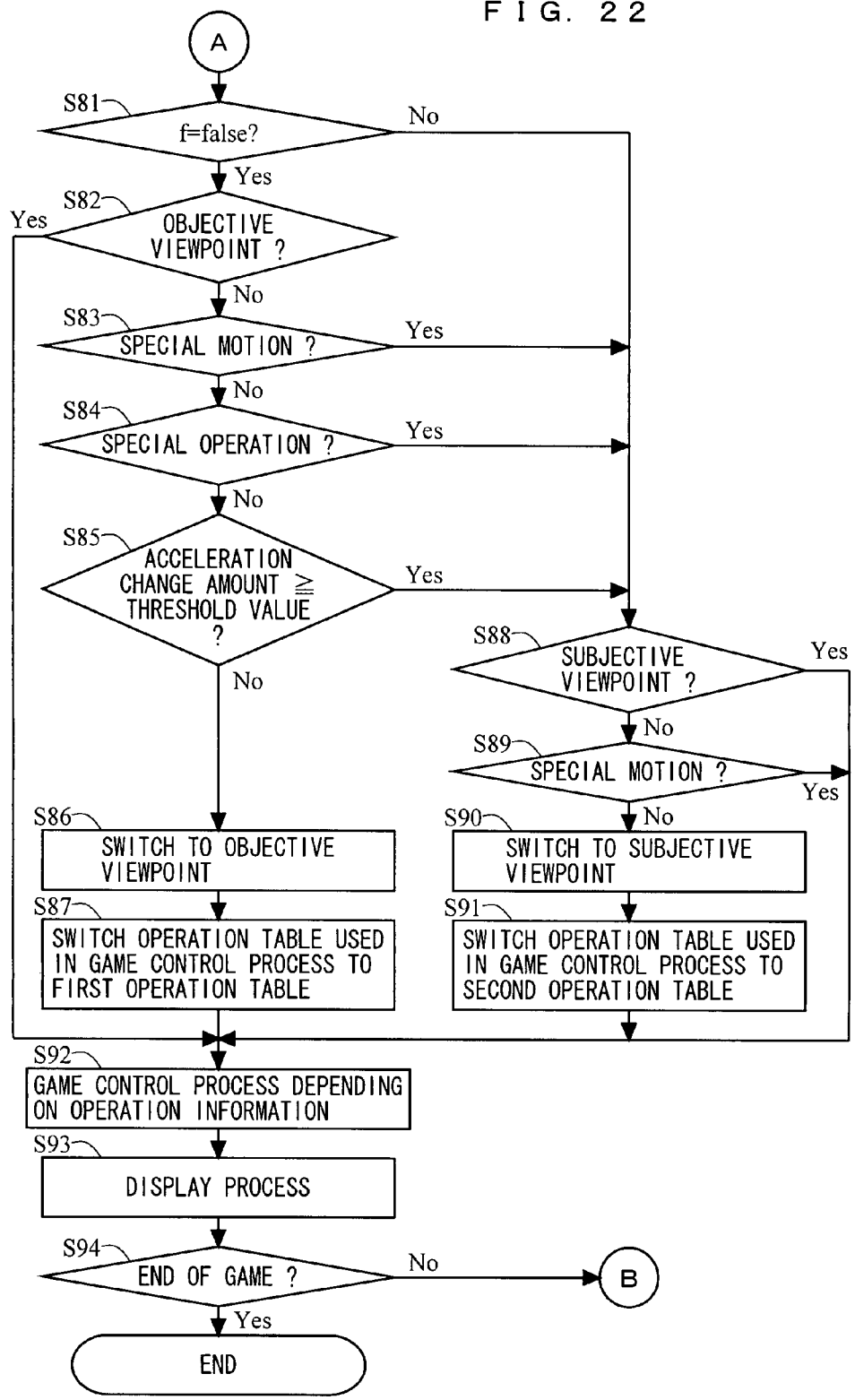
FIG. 22 is a flowchart illustrating a flow of a second half of the game process executed in the game apparatus 3.

Next, a game process performed in the game apparatus 3 will be described in detail with reference to FIGS. 21 and 22. Note that FIG. 21 is a flowchart illustrating a flow of a first half of the game process executed in the game apparatus 3. FIG. 22 is a flowchart illustrating a flow of a second half of the game process executed in the game apparatus 3. Note that the flowcharts of FIGS. 21 and 22 mainly describe a portion of the game process relating to switching of the operation modes using the controller 7, and the other portions of the game process which do not directly relate to the present invention will not be described. In FIGS. 21 and 22, each step executed by the CPU 30 is abbreviated as "S".

When the game apparatus 3 is powered ON, the CPU 30 of the game apparatus 3 executes a boot program stored in a boot ROM (not shown), thereby initializing each unit, such as the main memory 33 or the like. Thereafter, a game program stored on the optical disc 4 is read into the main memory 33, so that the execution of the game program is started by the CPU 30. The flowcharts of FIGS. 21 and 22 indicate a game process performed after completion of the above-described processes.

In FIG. 21, the CPU 30 executes initial setting for the game process (step 50) and goes to the next step. For example, the CPU 30 sets the check counter value CC to be 0 and causes the resultant check counter value CC to be stored as the check counter data Db4. The CPU 30 also sets the valid flag f to be false and causes the resultant valid flag f to be stored as the valid flag data Db5.

Next, the CPU 30 obtains operation information received from the controller 7 (step 51) and goes to the next step. Thereafter, the CPU 30 stores the operation information as the operation information Da into the main memory 33. Here, the operation information obtained in step 51 includes coordinate data indicating the positions in a captured image of the markers 8L and 8R (the first coordinate data Da1 and the second coordinate data Da2), data indicating how the operation section 72 of the controller 7 has been operated (the key data Da3), and data indicating an acceleration detected by the acceleration sensor 701 (the acceleration data Da4). Here, the communication section 75 transmits the operation information to the game apparatus 3 in predetermined time intervals (e.g., each interval is 5 ms). It is assumed that the CPU 30 utilizes the operation information per frame. Therefore, a process loop of steps 51 to 94 of FIGS. 21 and 22 is repeated per frame.

Next, the CPU 30 determines whether or not valid process result data (the first coordinate data Da1 and the second coordinate data Da2) has been obtained from the controller 7 (step 52). For example, when at least one of the first coordinate data Da1 and the second coordinate data Da2 has been updated with latest coordinate information (i.e., the image capture information computing section 74 has captured an image of at least one of the markers 8L and 8R), the CPU 30 determines that valid process result data has been obtained. Thereafter, when valid process result data has been obtained, the CPU 30 goes to the next step 53. On the other hand, when valid process result data has not been obtained, the CPU 30 goes to the next step 58.

In step 53, the CPU 30 uses the operation information obtained in step 51 to calculate position coordinates in the screen coordinate system and causes the position coordinates to be stored as the screen coordinate data Db3 (step 51), and goes to the next step 54. Hereinafter, an example of the calculation of screen coordinates using the operation information will be described in detail.

In step 53, the CPU 30 calculates the direction data Db1 from the first coordinate data Da1 to the second coordinate data Da2. Specifically, with reference to the first coordinate data Da1 and the second coordinate data Da2, the CPU 30 calculates a vector whose start point is the position of the first coordinate data Da1 and whose end point is the position of the second coordinate data Da2. Thereafter, the CPU 30 stores the calculated vector data as the direction data Db1 into the main memory 33. Based on a difference between the direction data Db1 and a predetermined reference direction, a rotation around a direction (axis) perpendicular to the image capture surface of the controller 7 can be calculated.

The CPU 30 also calculates the middle point data Db2 indicating a middle point between the first coordinate data Da1 and the second coordinate data Da2. Specifically, the CPU 30 calculates coordinates of the middle point with reference to the first coordinate data Da1 and the second coordinate data Da2. Thereafter, the CPU 30 stores data of the calculated middle point coordinates as the middle point data Db2 into the main memory 33. Here, the middle point data Db2 indicates a position of a target image (the markers 8L and 8R) in a captured image. Based on a difference between the middle point data Db2 and a predetermined reference position, a change in image position due to a change in position of the controller 7 can be calculated.

Here, a positional relationship between the markers 8L and 8R, the display screen of the monitor 2, and the controller 7 will be discussed. For example, it is assumed that the two markers 8L and 8R are provided on the upper surface of the monitor 2 (see FIG. 10), and the player uses the controller 7 with the upper surface facing upward to point out a center of the display screen of the monitor 2 (an image of a center of the display screen is captured at a center of a captured image of the image capture information computing section 74). In this case, in the captured image of the image capture information computing section 74, the position of the middle point of the target images (the middle point of the markers 8L and 8R) does not coincide with the pointed position (the center of the display screen). Specifically, the position of the target image in the captured image is located above the center of the captured image. A reference position is set so that, when the target images are located at such positions, the center of the screen is assumed to be pointed out. The positions of the target images in the captured image move, corresponding to a movement of the controller 7 (their movement directions are opposite to each other). Therefore, by performing a process of moving a position pointed out in the display screen, corresponding to the movement of the positions of the target images in the captured image, the display screen reference position pointed out by the controller 7 (position coordinates in the screen coordinate system) can be calculated. Here, regarding the setting of the reference position, the player may previously point out a predetermined position on the display screen and store positions of the target images in this case in association with the predetermined position. If the positional relationship between the target images and the display screen is fixed, the reference position may be previously set. When the markers 8L and 8R are separated from the monitor 2 and are arranged in the vicinity of the monitor 2 (e.g., above or below the monitor 2) in use, the player is caused to input the positions of the markers 8L and 8R with respect to the monitor 2 before the start of a game (e.g., the player is caused to select the option of above or below the monitor 2 or the like). In this case, reference position data when the markers 8L and 8R are provided above the monitor 2 and reference position data when the markers 8L and 8R are provided below the monitor 2 may be stored on the optical disc 4, a built-in non-volatile memory in the game apparatus 3, or the like, and may be selected in use. Such position coordinates in the screen coordinate system are calculated by linear transformation using a function of calculating reference coordinates (the screen coordinate data Db3) of the display screen of the monitor 2 from the middle point data Db2. This function transforms the coordinate values of the middle point calculated from a captured image into the coordinates of a position on the display screen (position coordinates in the screen coordinate system) pointed out by the controller 7 when the captured image is taken. By using this function, a pointed position where the display screen is a reference can be calculated from the coordinates of the middle point.

However, when the player points out the center of the display screen of the monitor 2 using the controller 7 with the upper surface facing a direction (e.g., a rightward direction) other than the upward direction, the positions of the target images in the captured image are shifted from the center of the captured image in a direction (e.g., a leftward direction) other than the upward direction. In other words, due to the tilt of the controller 7, the movement direction of the controller 7 may not be equal to the movement direction of the display screen reference pointed position. Therefore, based on the direction data Db1, the middle point data Db2 is corrected. Specifically, the middle point data Db2 is corrected into the coordinates of the middle point when it is assumed that the upper surface of the controller 7 faces upward. More specifically, when the reference position is set, a reference for direction data is also set. The middle point data Db2 calculated in step 64 is corrected by rotating and shifting the coordinates indicated by the middle point data Db2 abound the center of the captured image by an amount corresponding to a difference in angle between the direction data Db1 and the reference direction. Thereafter, the corrected middle point data Db2 is used to calculate the screen coordinate data Db3 as described above.

Referring back to FIG. 21, in step 54, the CPU 30 determines whether or not the position coordinates in the screen coordinate system are within a predetermined range. Thereafter, when the position coordinates are within the predetermined range, the CPU 30 goes to the next step 55. On the other hand, when the position coordinates are out of the predetermined range, the CPU 30 goes to the next step 58. Here, the predetermined range may be any range within which a position pointed out by the controller 7 can be detected. For example, when the detectable range is larger than the display screen of the monitor 2, the predetermined range may be set to be the same as or larger than the display screen. Alternatively, a portion of the display screen may be designated as the predetermined range.

In step 55, the CPU 30 determines whether or not the check counter value CC stored as the check counter data Db4 is less than 0. Thereafter, when the check counter value CC is less than 0, the CPU 30 sets the check counter value CC to be 0 (step 56), and goes to the next step 57. On the other hand, when the check counter value CC is 0 or more, the CPU 30 goes to the next step 57, leaving the check counter value CC as it is. Thereafter, the CPU 30 adds 1 to the current check counter value CC and updates the check counter data Db4 in step 57, and goes to the next step 61.

On the other hand, when valid process result data has not been obtained (No in step 52) and the position coordinates in the screen coordinate system are out of the predetermined range (No in step 54), the CPU 30 goes to step 58. In step 58, the CPU 30 determines whether or not the check counter value CC stored as the check counter data Db4 is more than 0. Thereafter, when the check counter value CC is more than 0, the CPU 30 sets the check counter value CC to be 0 (step 59), and goes to the next step 60. On the other hand, when the check counter value CC is 0 or less, the CPU 30 goes to the next step 60, leaving the check counter value CC as it is. Thereafter, the CPU 30 subtracts 1 from the current check counter value CC and updates the check counter data Db4 in step 60, and goes to the next step 61.

Next, the CPU 30 determines whether or not the check counter value CC stored in the check counter data Db4 is 2 or more (step 61), and whether or not the check counter value CC is −8 or less (step 63). Thereafter, when the check counter value CC is 2 or more (Yes in step 61), the CPU 30 sets the valid flag f to be true and causes the resultant valid flag f to be stored as the valid flag data Db5 (step 62), and goes to the next step 81 (FIG. 22). Also, when the check counter value CC is −8 or less (Yes in step 63), the CPU 30 sets the valid flag f to be false and causes the resultant valid flag f to be stored as the valid flag data Db5 (step 64), and goes to the next step 81. Also, when the check counter value CC is more than −8 and no more than 2 (No both in step 61 and in step 63), the CPU 30 goes to the next step 81, leaving the check counter value CC as it is.

As can be clearly seen from the processes of steps 52 to 64, when the position coordinates in the screen coordinate system are moved from the outside of the predetermined range to the inside of the predetermined range, the check counter value CC is set to be 0, and when the position coordinates in the screen coordinate system are consecutively determined to be within the predetermined range, the valid flag f is set to be true. Thereafter, as long as the position coordinates in the screen coordinate system are within the predetermined range, the valid flag f is true. On the other hand, when the position coordinates in the screen coordinate system are moved from the inside of the predetermined range to the outside of the predetermined range, the check counter value CC is set to be 0, and thereafter, when the position coordinates in the screen coordinate system are determined during seven consecutive process cycles to be out of the predetermined range, the valid flag f is set to be false. Thereafter, as long as the position coordinates in the screen coordinate system are out of the predetermined range, the valid flag f is false. In other words, the change of the valid flag f from true to false is slower than the change of the valid flag f from false to true. Therefore, as described below, the transition from the first operation mode to the second operation mode is set to be fast, while the transition from the second operation mode to the first operation mode is set to be slow.

In FIG. 22, in step 81, the CPU 30 determines whether or not the valid flag f stored as the valid flag data Db5 is false. Thereafter, when the valid flag f is false, the CPU 30 determines whether or not the current image is an objective image (step 82), whether or not the current motion is a special motion (step 83), whether or not the current operation is a special operation (step 84), and whether or not the acceleration change amount is a threshold value or more (step 85). When all of steps 82 to 85 are No, the CPU 30 goes to the next step 86. On the other hand, when the valid flag f is true or when the determination in at least one of steps 83 to 85 is Yes, the CPU 30 goes to the next step 88. Also, when the determination in step 82 is Yes, the CPU 30 goes to the next step 92.

In step 86, the CPU 30 goes from the second operation mode to the first operation mode, and calculates and stores the position and direction of the virtual camera C in a switched objective image (see FIGS. 14 and 15) into the virtual camera data Dc3. Note that the position and direction of the virtual camera C in the objective image are obtained in a manner similar to that which has been described with reference to FIGS. 14 and 15 and will not be here described in detail. Thereafter, the CPU 30 switches an operation table for use in the game control process from the second operation table to the first operation table (see FIG. 19) (step 87), and goes to the next step 92.

On the other hand, when the valid flag f is true or when the determination of at least one of steps 83 to 85 is Yes, the CPU 30 determines whether or not the current image is a subjective image (step 88) and whether or not the current motion is a special motion (step 89). Thereafter, when the determinations both in step 88 and in step 89 are No, the CPU 30 goes to the next step 90. On the other hand, when the determination in at least one of steps 88 and 89 is Yes, the CPU 30 goes to the next step 92.

In step 90, the CPU 30 goes from the first operation mode to the second operation mode, and calculates and stores the position and direction of the virtual camera C in a switched subjective image (see FIGS. 16 and 17) into the virtual camera data Dc3. Note that the position and direction of the virtual camera C in the subjective image are obtained in a manner similar to that which has been described with reference to FIG. 16 and FIG. 17 and will not be here described in detail. Thereafter, the CPU 30 switches an operation table for use in the game control process from the first operation table to the second operation table (see FIG. 20) (step 91), and goes to the next step 92.

In step 92, the CPU 30 uses the first or second operation table of current interest to perform a game control process corresponding to the operation information obtained in step 51, and goes to the next step. The CPU 30 causes the player character P to act or move or the virtual camera C to move using the key data Da3 and the acceleration data Da4 updated and stored as the operation information Da and the screen coordinate data Db3 and the designated position data Dc1 updated and stored as the operation state information Db. Here, the operation table used in step 92 differs between in the first operation mode and in the second operation mode, so that the contents of the game control processes corresponding to the respective operation means are different. Therefore, the player can control the game using the controller 7, depending on the operation modes.

Also, in the second operation mode, when the position coordinates in the screen coordinate system calculated in step 53 are transformed into coordinates indicating a position in the game space, the position may be further transformed into a position in the game space corresponding to a position in the screen coordinate system. Here, the position in the game space corresponding to the position in the screen coordinate system refers to a position (e.g., a perspectively projected position) in the game space displayed at a position on the display screen of the monitor 2, three-dimensional coordinate values in the game space directly designated from the position coordinates in the screen coordinate system, or the like.

The essential principle of the process of calculating the screen coordinate data Db3 is that a displacement from a pointed two-dimensional coordinate predetermined reference position due to a change in position of the target image by the movement of the controller 7 is calculated to set coordinates. Therefore, the position coordinates in the screen coordinate system can be widely used as other two-dimensional coordinate inputs. For example, the position coordinates in the screen coordinate system can be directly used as an x coordinate and a y coordinate in the world coordinate system. In this case, a calculation process may be performed to cause a movement of the target image to correspond to a movement from the reference position of the x and y coordinates in the world coordinate system, independently of the display screen of the monitor 2. For example, when a two-dimensional game image is displayed on the monitor 2, the position coordinates in the screen coordinate system can be directly used as x and y coordinate values in the two-dimensional game coordinate system.

Next, the CPU 30 draws a virtual game space where the virtual camera C is a viewpoint and displays a game image on the monitor 2 (step 93), and goes to the next step. Here, regarding the virtual camera C in the virtual game space, parameters are set so that an objective image or a subjective image with respect to the player character P is obtained, depending on the current operation mode. Thereafter, a position where the virtual camera C is placed is adjusted to generate a game image, depending on a player's operation.

For example, when the player is pressing down the first button (the operation button 72b) of the controller 7 in the second operation mode, the virtual camera C is placed at a position in the subjective image where the head portion of the player character P is a viewpoint.

Also, assuming that the player moves a position (the position of the aiming cursor T) pointed out by the controller 7 while pressing down the B-button (the operation button 72i) of the controller 7 in the second operation mode, when the position of the aiming cursor T enters a peripheral region of the game image (e.g., a peripheral region A inside the displayed image or a peripheral region outside the displayed image in FIG. 16), or when the B-button is pressed down while the aiming cursor T is present within the peripheral region, the direction of the virtual camera C is changed so that a position in the virtual game space corresponding to the position of the aiming cursor T is displayed on the display screen of the monitor 2 (in this case, the viewpoint of the virtual camera C position may not be changed). Specifically, when the aiming cursor T is present in an upper region of the game image, the direction of the virtual camera C is changed further upward than the current direction; when the aiming cursor T is present in a lower region, the direction of the virtual camera C is changed further downward than the current direction; when the aiming cursor T is present in a right region, the direction of the virtual camera C is changed further rightward than the current direction; and when the aiming cursor T is present in a left region, the direction of the virtual camera C is changed further leftward than the current direction (i.e., the game image is scrolled and displayed on the monitor 2 in a direction in which the player points out the outside of the display screen using the controller 7). Note that, in this state (i.e., in a state in which the direction of the virtual camera C is changed when the aiming cursor enters the peripheral region while the B-button is being pressed down or when the B-button is pressed down while the aiming cursor is present in the peripheral region), when the position pointed out by the controller 7 is out of the game image or the display screen or cannot be detected, the direction of the virtual camera C may continue to be changed in an upward direction/downward direction/leftward direction/rightward direction, depending on a region (upper portion/lower portion/left portion/right portion) of the peripheral region in which the aiming cursor is last present, as long as the B-button continues to be pressed down.

Here, the above-described state in which a game image is scrolled is a state in which, although the determination in step 84 is Yes and the controller 7 points out the outside of the predetermined range, a transition from the second operation mode to the first operation mode does not take place, as described below. In other words, this state gives the player an anxiety that, although the controller 7 points out the outside of the predetermined range, the transition to the first operation mode does not take place. For example, when the player changes the way of holding the controller 7 from longitudinal holding to lateral holding while pressing the B-button, this state becomes significant. However, since the B-button provided in the hollow portion of the lower surface of the controller 7 is forcedly released from the finger of the player when the controller 7 is laterally held (see FIG. 9), it is possible to naturally avoid the above-described anxiety.

Next, the CPU 30 determines whether or not the game is ended (step 94). The game is ended under a condition, such as, for example, that a condition for game over (e.g., a parameter for the strength of the player character P is 0, etc.) is satisfied, that the player performs an operation of ending the game, or the like. When the game is not ended, the CPU 30 returns to and repeats step 51 (FIG. 21). When the game is ended, the CPU 30 ends the process of the flowchart.

Here, specific contents of steps 81 to 85 will be described. Steps 83 to 85 are executed under conditions that the valid flag f is false and the current image is a subjective image. In other words, this is a state in which, whereas the position coordinates in the screen coordinate system pointed out by the controller 7 are not within the predetermined range (e.g., the player does not direct the front surface of the controller 7 toward the monitor 2), the viewpoint of the virtual camera C is set in a subjective image. Specifically, when the current motion is a special motion, the current operation is a special operation, and the acceleration change amount is a threshold or more, neither the transition from the second operation mode to the first operation mode nor the transition from a subjective image to an objective image is performed.

The condition in step 83 that the current motion is a special motion is that the player character P is performing the special motion in the virtual game space in the second operation mode. For example, the player character P is jumping in the virtual game space by the player swinging up the acceleration sensor, a beam is being charged by the player performing long press of the A-button, and the like. Note that, when the state during jumping is determined, the state may be determined to be "in motion" until the jumping motion is completed; the state may be determined to be "in motion", including a while after the completion of the jump motion; or the state may be determined to be "in motion", including only a predetermined period until a halfway point of the jump motion. The condition in step 84 that the current operation is a special operation is that the player is performing the special operation using the controller 7 in the second operation mode. For example, the player is performing an operation of pressing down the B-button (the operation button 72i) or the first button (the operation button 72b). Here, as indicated in FIG. 20, when the player is pressing down the B-button in the second operation mode, it is often that the game image is being scrolled and displayed, or it is partway through an operation employing a combination of other buttons. When the player is pressing down the first button in the second operation mode, the viewpoint is being moved toward the head portion of the player character P. As in these examples, if the operation modes or the viewpoints are forcedly switched during a special motion or a special operation, the player's operation may be forcedly canceled or the game screen is changed with the viewpoint being unnaturally changed, resulting in confusion in the operation. To prevent such a mode change, the changing of the modes is partially limited during a motion and an operation.

When the acceleration change amount is the threshold or more (the condition in step 85), a change amount obtained by combining accelerations in the X-, Y- and Z-axis directions detected by the acceleration sensor 701 indicates a previously set threshold or more (note that it may be detected that a predetermined component is a threshold or more). For example, in the second operation mode, when the player is performing an operation by moving the whole controller 7 (e.g., the controller 7 is swung up, etc.), a position pointed out by the controller 7 may depart from the above-described predetermined range. If the second operation mode is switched to the first operation mode in response to the departing from the predetermined range, confusion occurs in the player's operation. Also, it is considerably difficult to move the whole controller 7 without a position pointed out by the controller 7 departing from the predetermined range. Therefore, to prevent such a mode change, when the whole controller 7 is being moved by the player, the fact that any of the acceleration change amounts in the X-, Y- and Z-axis directions detected by the acceleration sensor 701 is large is utilized to prevent the mode change during movement of the controller 7.

Specific contents of steps 81, 88 and 89 will be described. Step 89 is executed under conditions that the valid flag f is true and the current image is an objective image. Specifically, the condition is that the position coordinates in the screen coordinate system pointed out by the controller 7 are within the predetermined range (e.g., the player directs the front surface of the controller 7 toward the monitor 2), and the viewpoint of the virtual camera C is set in an objective image. Specifically, during a special motion, neither a transition from the first operation mode to the second operation mode nor a transition from an objective image to a subjective image is executed.

The condition in step 89 that the current motion is a special motion is that the player character P is performing the special motion in the virtual game space in the first operation mode. For example, the player character P is jumping in the virtual game space. As in this example, if the operation modes or the viewpoints are forcedly changed during the special motion, the game screen is changed with the viewpoint being unnaturally changed, resulting in confusion in the operation. To prevent such a mode change, the switching of the modes from the first operation mode to the second operation mode is partially limited during a motion.

Note that the above-described objective and subjective images and the contents of the control corresponding to each operation means are only for illustrative purposes, and the present invention can be achieved even in the case of other contents of a viewpoint change and a game control. For example, although the aiming direction of the gun in the virtual game space is changed, depending on the acceleration detected by the acceleration sensor 701 in the first operation mode, it may be changed, depending on the operation of any of the operation sections 72 provided in the controller 7. Also, when the controller 7 is provided with a joystick, the aiming direction of the gun may be changed in the first operation mode, depending on a tilt direction of the joystick. Thus, depending on the form of the operation section 72 provided in the controller 7, the contents of a game control corresponding to the operation of each operation means are set, corresponding to the operation attitude of the player, thereby making it possible to provide various changes.

Thus, operation modes in which the different contents of game processes are set are automatically switched, depending on a position whose coordinates are designated by the player using a pointing device capable of outputting data for designating coordinates remotely with respect to a display screen. As an example of the contents of a game process to be changed, the position or direction in the game space of the virtual camera C is changed to a subjective image or an objective image. As another example of the contents of a game process to be changed, the contents of a game control corresponding to the operation of each operation means are changed. For example, in the first operation mode, the aiming direction (aiming position) in the virtual game space of the gun held by the player character P is changed, depending on an acceleration detected by the acceleration sensor 701 or an operation with respect to the operation section 72, and in the second operation mode, the aiming position is changed, depending on the process result data of the image capture information computing section 74. Also, in the first operation mode, by the player laterally holding the controller 7, a game image is displayed in which the focusing point from a lateral direction of the player character P substantially coincides with the player character P. In the second operation mode, by the player longitudinally holding the controller 7 to point the monitor 2, a game image is displayed in which the viewpoint substantially coincides with the player character P so that the focusing point is set to be in a direction facing the player character P. Therefore, according to the present invention, in a game apparatus which employs a pointing device capable of outputting data for remotely designating coordinates with respect to a display screen, operation methods and viewpoints can be automatically changed as appropriate during execution of the same game.

Note that it has been described above that, as an example of a pointing device capable of outputting data for remotely designating coordinates with respect to a display screen, image data obtained by capturing images of targets by the image capturing element 743 provided in the controller 7 is analyzed, thereby designating coordinates with respect to the display screen of the monitor 2. In this embodiment, two markers (targets whose images to be captured) are provided in the vicinity of the display screen, a device comprising an image capturing means and a housing capable of freely changing an image capturing direction thereof detects the two markers in a captured image, and a coordinate position pointed out by the device is obtained based on positions in the captured image of the markers. However, the pointing device may be in other forms.

For example, a target whose image is to be captured and which is provided in the vicinity of a display screen may be a member which reflects light or a physical marker which has a specific color or a specific shape as well as the above-described electrical marker (LED module). Alternatively, such a target whose image is to be captured may be displayed on the display screen of the monitor 2. Alternatively, the image capturing means included in the controller 7 may be used to read scan lines on a raster scan type monitor, thereby utilizing the monitor itself as a target whose image is to be captured. Alternatively, a magnetic field generating apparatus is provided, and magnetic field generated by the magnetic field generating apparatus may be used to remotely designate coordinates. In this case, the controller 7 is provided with a magnetic sensor for detecting the magnetic field.

Although it has also been described above that infrared light beams from the two markers 8L and 8R are targets whose images are to be captured by the image capture information computing section 74 of the controller 7, other things may be targets whose images are to be captured. For example, one or three or more markers may be provided in the vicinity of the monitor 2, and infrared light beams from these markers may be used as targets whose images are to be captured by the image capture information computing section 74. For example, if a single marker having a predetermined length is provided in the vicinity of the monitor 2, the present invention can be similarly achieved. Alternatively, the display screen itself of the monitor 2 or other light emitting objects (an interior lamp, etc.) may be used as targets whose images are to be captured by the image capture information computing section 74. If a position of the controller 7 with respect to the display screen is calculated based on an arrangement relationship between a target whose image is to be captured and the display screen of the monitor 2, various light emitting objects can be used as targets whose images are to be captured by the image capture information computing section 74.

A target whose image to be captured (a marker, etc.) may be provided on the controller 7, and an image capturing means may be provided on the monitor 2. In a still another example, a mechanism for emitting light from the front surface of the controller 7 may be provided. In this case, an image capturing device for capturing an image of the display screen of the monitor 2 may be provided at a place other than those of the controller 7 and the monitor 2. By analyzing a position where light emitted from the controller 7 toward the display screen of the monitor 2 is reflected, based on the image captured by the image capturing device, it is similarly possible to provide a pointing device which can output data for remotely designating coordinates with respect to the display screen. Alternatively, by calculating an attitude or a motion of the controller 7 using acceleration data from the acceleration sensor 701 provided in the controller 7, coordinates may be remotely designated with respect to the display screen. Thus, by using a controller having an acceleration sensor within a housing, it is similarly possible to provide a pointing device which can output data for remotely designating coordinates with respect to the display screen.

Although it has also been described above that the controller 7 and the game apparatus 3 are connected via wireless communication, the controller 7 and the game apparatus 3 may be electrically connected via a cable. In this case, a cable connected to the controller 7 is connected to a connection terminal of the game apparatus 3.

Although it has also been described above that the reception unit 6 connected to a connection terminal of the game apparatus 3 is used as a reception means for receiving transmission data wirelessly transmitted from the controller 7, the reception means may be configured using a reception module provided inside the main body of the game apparatus 3. In this case, transmission data received by the reception module is output via a predetermined bus to the CPU 30.

Although it has also been described above that image data captured by the image capturing element 743 is analyzed to obtain position coordinates, center-of-gravity coordinates thereof, and the like of infrared light from the markers 8L and 8R, and these are generated as process result data in the controller 7 and are transmitted to the game apparatus 3, data in other process stages may be transmitted form the controller 7 to the game apparatus 3. For example, image data captured by the image capturing element 743 may be transmitted from the controller 7 to the game apparatus 3, and may be subjected to the analysis process in the CPU 30 to obtain process result data. In this case, the image processing circuit 744 provided in the controller 7 is no longer required. Also, data obtained partway through analysis of the image data may be transmitted from the controller 7 to the game apparatus 3. For example, data indicating a luminance, a position, an area, and the like obtained from the image data may be transmitted from the controller 7 to the game apparatus 3, and the remaining analysis process may be performed in the CPU 30 to obtain process result data.

Note that the shape of the controller 7, and the shapes, number, installed positions and the like of the operation sections 72 are only for illustrative purposes, and the present invention can be achieved with other shapes, number, and installed positions. The position (the light entering opening of the image capture information computing section 74) of the image capture information computing section 74 in the controller 7 may not be on the front surface of the housing 71, and may be provided on other surfaces if light can be taken in from the outside of the housing 71.

Although it has also been described above that a game image in the first operation mode and a game image in the second operation mode are generated using viewpoints which are changed with respect to the same three-dimensional game space, another game image may be displayed on the monitor 2. For example, at least one of the game images may be a two-dimensional game image. Also, one of the game images may be a functional image, such as an icon image or the like. For example, by providing the game image in the second operation mode as a functional image including a plurality of icons, the player can select the icons by pointing out using the controller 7, resulting in a preferable operation.

Regarding a storage medium storing a game program of the present invention and a game apparatus and a game system of the present invention, operation modes having different contents of game processes can be automatically changed, depending on a position whose coordinates are designated by the player using a pointing device capable of outputting data for remotely designating coordinates. The present invention is useful as a game program which is executed by a game apparatus which is operated using the pointing device or the like, a game apparatus, a game system, or the like.

While the invention has been described in detail, the foregoing description is in all aspects illustrative and not restrictive. It is understood that numerous other modifications and variations can be devised without departing from the scope of the invention.

What is claimed is:

1. A non-transitory storage medium storing a game program which is executed by a computer of a game apparatus comprising a pointing device configured to output data for remotely designating coordinates with respect to a predetermined detection surface, the game program having instructions causing the computer to perform functionality comprising:

attempting to obtain coordinates on the detection surface using the data output from the pointing device, the pointing device provided in a housing of a hand-held controller;

detecting whether or not the coordinates have been obtained and/or if the obtained coordinates fall within a predetermined region of the detection surface;

switching from performing a coordinate-unrelated process to performing a coordinate-related process in which a game process does not use the obtained coordinates when the coordinates have been obtained and/or if the obtained coordinates fall within the predetermined region of the detection surface;

switching from performing the coordinate-related process to performing the coordinate-unrelated process in which a game process does not use the obtained coordinates when the coordinates have not been obtained and/or if the obtained coordinates do not fall within the predetermined region of the detection surface.

2. The storage medium according to claim 1, wherein, in the detection step, it is detected whether or not coordinates on the detection surface have been obtained in the coordinate obtaining step.

3. The storage medium according to claim 1, wherein the game program causes the computer to further perform functionality comprising:

displaying on a display screen a game image as viewed from a virtual camera provided in a virtual three-dimensional game space, wherein the designated coordinate-unrelated process step includes determining a parameter of the virtual camera by performing a first computation based on a game parameter, and the designated coordinate-related process step includes determining a parameter of the virtual camera by performing a second computation different from the first computation based on a game parameter.

4. The non-transitory storage medium according to claim 1, wherein the game program further causes the computer to perform functionally comprising:

displaying on a display screen a game image as viewed from a virtual camera provided in a virtual three-dimensional game space, wherein the coordinate-unrelated process uses a first virtual camera control process in which a parameter of the virtual camera is controlled such that a game image is obtained in which a player character present in the virtual three-dimensional game space is objectively viewed, and the coordinate-related process uses a second virtual camera control process in which a parameter of the virtual camera is controlled such that a game image is obtained in which the player character subjectively views the virtual three-dimensional game space.

5. The storage medium according to claim 1, wherein the game program causes the computer to further perform functionality comprising:
   displaying on a display screen a game image as viewed from a virtual camera provided in a virtual three-dimensional game space,
   wherein the designated coordinate-unrelated process step includes determining a parameter of the virtual camera so that a focusing point of the virtual camera substantially coincides with a position of a player character, and
   the designated coordinate-related process step includes determining a parameter of the virtual camera so that a viewpoint of the virtual camera substantially coincides with a position of the player character.

6. The storage medium according to claim 1, wherein the game program causes the computer to further perform functionality comprising:
   displaying on a display screen a game image as viewed from a virtual camera provided in a virtual three-dimensional game space,
   wherein the designated coordinate-unrelated process step determines a parameter of the virtual camera so that a distance from a viewpoint of the virtual camera to a position of a player character is longer than the distance determined in the designated coordinate-related process step.

7. The storage medium according to claim 1, wherein the game program causes the computer to further perform functionality comprising:
   displaying on a display screen a game image as viewed from a virtual camera provided in a virtual three-dimensional game space,
   wherein the designated coordinate-unrelated process step determines a parameter of the virtual camera so as to generate a game image as the virtual three-dimensional game space is viewed in a direction traverse to a traveling direction or an orientation of a player character, and
   the designated coordinate-related process step determines a parameter of the virtual camera so as to generate a game image as the virtual three-dimensional game space is viewed in the traveling direction or the orientation of the player character.

8. The storage medium according to claim 1, wherein the pointing device comprises a direction designating section configured to designate a direction by a player's operation in addition to the pointing operation of remotely designating coordinates, and
   in the designated coordinate-unrelated process step, a movement of a player character is controlled in a virtual three-dimensional game space, depending on operation data from the direction designating section.

9. The storage medium according to claim 1, wherein the pointing device comprises an input section configured to detect a player's operation in addition to the pointing operation of remotely designating coordinates,
   in the designated coordinate-unrelated process step, a predetermined game process is executed as the designated coordinate-unrelated process, based on operation data generated by the input section, and
   in the designated coordinate-related process step, a game process different from the predetermined game process is executed based on the same operation data generated by the input section in addition to the designated coordinate-related process.

10. The storage medium according to claim 1, wherein the pointing device includes a housing which is held by a player,
    a first input section and a second input section whose operations by the player are detectable are provided at different positions of a surface of the housing,
    in the designated coordinate-unrelated process step, a predetermined game process is executed as the designated coordinate-unrelated process, based on operation data generated by the first input section, and
    in the designated coordinate-related process step, the same game process as the predetermined game process is executed based on operation data generated by the second input section, in addition to the designated coordinate-related process.

11. The storage medium according to claim 10, wherein, in the designated coordinate-related process step, a game process different from the predetermined game process is further executed based on the operation data generated by the first input section.

12. The storage medium according to claim 1, wherein the pointing device comprises an input section configured to detect a player's operation in addition to the pointing operation of remotely designating coordinates,
    in the designated coordinate-related process step, as the designated coordinate-related process, a predetermined game parameter is determined based on the coordinates obtained by the coordinate obtaining step, and
    in the designated coordinate-unrelated process step, as the designated coordinate-unrelated process, the game parameter is determined based on operation data generated by the input section.

13. The storage medium according to claim 12, wherein the game parameter is a direction parameter indicating a direction in a virtual three-dimensional game space,
    the input section is an input section configured to designate a direction,
    in the designated coordinate-related process step, as the designated coordinate-related process, the direction parameter is determined based on the coordinates obtained in the coordinate obtaining step, and
    in the designated coordinate-unrelated process step, as the designated coordinate-unrelated process, the direction parameter is determined based on the direction designated by the input section.

14. The storage medium according to claim 1, wherein the detection surface is set with respect to a display screen on which a game image is displayed,
    the pointing device is configured to output data for remotely designating coordinates with respect to the display screen,
    the game program causes the computer to further perform functionality comprising:
    displaying a game image representing a game space on the display screen; and
    calculating corresponding coordinates in the game space with which the coordinates obtained in the coordinate obtaining step coincide on the game image, and
    in the designated coordinate-related process step, as the designated coordinate-related process, a process is performed, depending on the position in the virtual three-dimensional game space calculated in the game space coordinate calculating step.

15. The storage medium according to claim 1, wherein the pointing device further comprises an input section for generating operation data, depending on a player's operation, in addition to the pointing operation of remotely designating coordinates, in the designated coordinate-related process step, in addition to the designated coordinate-related process, a game process different from the game process of the designated coordinate-related process is performed based on the operation data from the input section, in the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected, and in the switching step, even assuming that the transition has been detected in the detection step, when predetermined operation data is output from the input section, the designated coordinate-related process step is not switched to the designated coordinate-unrelated process step, so that the designated coordinate-related process step continues to be executed.

16. The storage medium according to claim 1, wherein the pointing device further comprises an input section for generating operation data, depending on a player's operation, in addition to the pointing operation of remotely designating coordinates, in the designated coordinate-unrelated process step, as the designated coordinate-unrelated process, a game process is performed based on the operation data from the input section, in the detection step, a transition from a state in which it is not detected that coordinates have been obtained within a predetermined region of the detection surface in the coordinate obtaining step, to a state in which it is detected that coordinates have been obtained within a predetermined region of the detection surface in the coordinate obtaining step, is detected, and in the switching step, even assuming that the transition has been detected in the detection step, when predetermined operation data is output from the input section, the designated coordinate-unrelated process step is not switched to the designated coordinate-related process step, so that the designated coordinate-unrelated process step continues to be executed.

17. The storage medium according to claim 1, wherein the pointing device further comprises an input section for generating operation data, depending on a player's operation, in addition to the pointing operation of remotely designating coordinates, the game program causes the computer to further perform functionality comprising displaying on a display screen a game image as viewed from a virtual camera provided in a virtual three-dimensional game space, in the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected, and in the switching step, assuming that the transition has been detected in the detection step, when predetermined operation data is output from the input section, the designated coordinate-related process step is not switched to the designated coordinate-unrelated process step, so that the designated coordinate-related process step continues to be executed, and a line-of-sight direction of the virtual camera is changed, depending on the coordinates obtained in the coordinate obtaining step.

18. The storage medium according to claim 1, wherein the game program causes the computer to further perform functionality comprising:

causing a player character existing in a virtual game world to perform an action, depending on a player's operation, in the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected, and in the switching step, assuming that the transition has been detected in the detection step, when the player character is performing a specific action, the designated coordinate-related process step is not switched to the designated coordinate-unrelated process step, so that the designated coordinate-related process step continues to be executed.

19. The storage medium according to claim 1, wherein the pointing device includes a housing which is held by a player, the housing is provided with a motion sensor, the game program causes the computer to further perform functionality comprising:

obtaining data detected and output by the motion sensor; and performing a predetermined game process based on data obtained, in the detection step, a transition from a state in which it is detected that coordinates have been obtained within a predetermined region of the detection surface in the coordinate obtaining step, to a state in which it is not detected that coordinates have been obtained within a predetermined region of the detection surface in the coordinate obtaining step, is detected, and in the switching step, even assuming that the transition has been detected in the detection step, when the motion sensor indicates an output having a predetermined threshold value or more, the designated coordinate-related process step is not switched to the designated coordinate-unrelated process step, so that the designated coordinate-related process step continues to be executed.

20. The storage medium according to claim 1, wherein said performing the coordinate-unrelated process switches to performing the coordinate-related process in which the game process uses the obtained coordinates if the obtained coordinates fall within the predetermined range of the detection surface.

21. A game apparatus comprising a pointing device configured to output data for remotely designating coordinates with respect to a predetermined detection surface, the apparatus configured to:

attempt to obtain coordinates on the detection surface using the data output from the pointing device, the pointing device provided in a housing of a hand-held controller;

detect whether or not the coordinates have been obtained and/or if the obtained coordinates fall within a predetermined region of the detection surface;

switch from performing a coordinate-unrelated process to performing a coordinate-related process which is a process which uses the obtained coordinates when the coordinates have been obtained and/or if the obtained coordinates fall within the predetermined region of the detection surface;

switch from performing the coordinate-related process to performing the coordinate-unrelated process which is a game process which does not use the obtained coordinates when the coordinates have not been obtained and/or if the obtained coordinates do not fall within the predetermined region of the detection surface.

22. A game system including game apparatus comprising a pointing device configured to output data for remotely designating coordinates with respect to a predetermined detection surface, wherein the pointing device provided in a housing of a hand-held controller, the housing being longer than it is wide, and the pointing device outputs data for obtaining as designated coordinates a position where a straight line extending from an end portion in a longitudinal direction of the pointing device intersects the detection surface, and the housing is provided with operation keys on both side portions along the longitudinal direction, the game apparatus configured to:

attempt to obtain coordinates on the detection surface based on the data output from the pointing device;

detect whether or not the coordinates have been obtained and/or if the obtained coordinates fall within a predetermined region of the detection surface;

switch from performing a coordinate-unrelated process to performing a coordinate-related process which is a game process which uses the obtained coordinates when the coordinates have been obtained and/or if the obtained coordinates fall within the predetermined region of the detection surface;

switch from performing the coordinate-related process to performing the coordinate-unrelated process which is a game process which does not use the obtained coordinates when the coordinates have not been obtained and/or if the obtained coordinates do not fall within the predetermined region of the detection surface.

* * * * *